United States Patent
Awatsu et al.

(10) Patent No.: US 7,471,810 B2
(45) Date of Patent: Dec. 30, 2008

(54) RENEWAL METHOD AND RENEWAL APPARATUS FOR AN IC CARD HAVING BIOMETRICS AUTHENTICATION FUNCTIONS

(75) Inventors: Kiyotaka Awatsu, Inagi (JP); Takahiro Kudou, Maebashi (JP); Hiroshi Imamura, Inagi (JP); Masako Fujiwara, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 744 days.

(21) Appl. No.: 11/153,360

(22) Filed: Jun. 16, 2005

(65) Prior Publication Data

US 2006/0151599 A1 Jul. 13, 2006

(30) Foreign Application Priority Data

Jan. 11, 2005 (JP) .............................. 2005-004516

(51) Int. Cl.
*G06K 9/00* (2006.01)
(52) U.S. Cl. ....................................... 382/115; 382/124
(58) Field of Classification Search .................. 382/115
See application file for complete search history.

(56) References Cited

U.S. PATENT DOCUMENTS

| 2004/0123114 | A1  | 6/2004 | McGowan |         |
|--------------|-----|--------|---------|---------|
| 2006/0046691 | A1* | 3/2006 | Nishio  | 455/410 |

FOREIGN PATENT DOCUMENTS

| EP | 0 949 595   | A2 | 10/1999 |
| EP | 1 387 309   | A2 | 2/2004  |
| JP | 2000-293491 |    | 10/2000 |
| JP | 2002-63141  |    | 2/2002  |
| JP | 200292553   | A  | 3/2002  |
| JP | 2002269504  | A  | 9/2002  |
| JP | 2004-110365 |    | 4/2004  |
| JP | 2004142470  | A  | 5/2004  |
| JP | 2004252578  | A  | 9/2004  |
| WO | WO 99/66448 |    | 12/1999 |

OTHER PUBLICATIONS

European Search Report dated Nov. 23, 2006, Application No. 05253914.5-2211.
Decision to Grant a Patent No. 9-5-2007-041445821 dated Jul. 30, 2007.

* cited by examiner

*Primary Examiner*—David V Bruce
(74) *Attorney, Agent, or Firm*—Westerman, Hattori, Daniels & Adrian, LLP.

(57) ABSTRACT

A renewal apparatus for an IC card, which utilizes biometrics information to perform individual authentication, prevents the divulgence of biometrics data during renewal, while rigorously confirming the identity of the individual. A control unit confirms the identity of the individual in biometrics authentication by the biometrics authentication functions of an old IC card, and confirmation of the identity of the individual is performed rigorously using the IC card with biometrics authentication functions. If confirmation of the identity of the individual is satisfactory, the biometrics data obtained in the biometrics authentication is registered in a new IC card. The renewal can be performed with only a single image capture operation, and divulgence of biometrics information is prevented.

19 Claims, 19 Drawing Sheets

VEIN IMAGE N1

|   | 0 | 1 | 2 | 3 | 4 |
|---|---|---|---|---|---|
| 0 | 255 | 255 | 0 | 255 | 255 |
| 1 | 255 | 255 | 0 | 0 | 0 |
| 2 | 255 | 255 | 0 | 255 | 0 |
| 3 | 0 | 0 | 255 | 0 | 0 |
| 4 | 0 | 0 | 0 | 255 | 0 |

VEIN IMAGE N2

|   | 0 | 1 | 2 | 3 | 4 |
|---|---|---|---|---|---|
| 0 | 255 | 255 | 0 | 0 | 255 |
| 1 | 255 | 255 | 255 | 0 | 0 |
| 2 | 255 | 255 | 0 | 255 | 255 |
| 3 | 0 | 0 | 255 | 255 | 0 |
| 4 | 0 | 0 | 0 | 255 | 255 |

US 7,471,810 B2

RENEWAL METHOD AND RENEWAL APPARATUS FOR AN IC CARD HAVING BIOMETRICS AUTHENTICATION FUNCTIONS

CROSS-REFERENCE TO RELATED APPLICATIONS

This application is based upon and claims the benefit of priority from the prior Japanese Patent Application No. 2005-004516, filed on Jan. 11, 2005, the entire contents of which are incorporated herein by reference.

BACKGROUND OF THE INVENTION

1. Field of the Invention

This invention relates to a renewal method and renewal apparatus for an IC card having biometrics authentication functions to perform individual authentication utilizing characteristics of a portion of the body of the individual, and in particular relates to a renewal method and renewal apparatus for an IC card having biometrics authentication functions appropriate for performing individual authentication and for preventing the release of biometrics information.

2. Description of the Related Art

There are numerous portions of the human body which can differentiate the individual, such as fingerprints and toeprints, the retinas of the eyes, facial features, and blood vessels. With advances in biometrics technology in recent years, various apparatuses have been provided which identify biometrics features of a portion of the human body to authenticate individuals.

For example, because blood vessels and prints of the palms and fingers of the hands provide a comparatively large quantity of individual characteristic data, they are suitable with respect to reliability of individual authentication. Blood vessel (vein) patterns in particular remain unchanged throughout life from infancy, and are regarded as being completely unique, and so are well-suited to individual authentication. In palm authentication methods, when the user brings his palm into proximity with an image capture apparatus at the time of registration or authentication, the image capture apparatus emits near-infrared rays, which are incident on the palm of the hand. The image capture apparatus uses a sensor to capture near-infrared rays rebounding from the palm of the hand.

Hemoglobin in the red corpuscles flowing in the veins has lost oxygen. This hemoglobin (reduced hemoglobin) absorbs near-infrared rays at wavelengths near 760 nanometers. Consequently when near-infrared rays are made incident on the palm of a hand, reflection is reduced only in the areas in which there are veins, and the intensity of the reflected near-infrared rays can be used to identify the positions of veins.

The user first uses an image capture apparatus to register vein image data of the palm of own hand in a server or on a card. Then, in order to perform individual authentication, the user employs the image capture apparatus to read the vein image data of own hand. The registered vein image retrieved using the ID of the user is verified against the vein pattern of the vein image for verification thus read to perform individual authentication (see for example Japanese Patent Laid-open No. 2004-062826).

Such a biometrics authentication system must ensure that biometrics characteristic data is not divulged to third parties. Hence in the field of fingerprint authentication, a method has been proposed in which fingerprint characteristic data for an individual is registered in advance in an IC (Integrated Circuit) card having biometrics authentication functions, and fingerprint characteristic data read from a fingerprint sensor is verified against the data within the IC card to perform individual authentication (Japanese Patent Laid-open No. 2000-293643).

In this method, at the time of individual authentication an IC card is used, so that divulgence of biometrics characteristic data to third parties can be prevented, and the security of individual data can be maintained.

On the other hand, such IC cards also have an expiration date specified, and IC cards must be renewed. In the cases of magnetic stripe cards and IC cards not having authentication functions, a method is adopted in which the issuer sends a new card with data recorded to the user, and the user destroys the old card.

However, in the case of an IC card with biometrics authentication functions, as described above, biometrics characteristic data is stored only in the IC card, so that the issuer cannot issue a new card in which the biometrics characteristic data is recorded. Hence if the user does not re-register biometrics characteristic data in the new IC card, biometrics authentication functions cannot be used.

In re-registration of biometrics characteristic data in a new IC card, if a person who has brought a new IC card sent from the issuer is permitted to register biometrics characteristic data, and if the person is not the individual in question, then the biometrics characteristic data of another individual is registered, with the possibility of illicit use of the card. Conversely, if retrieval of biometrics characteristic data from an IC card is permitted, there is the problem that the biometrics characteristic data may be divulged to a third party.

SUMMARY OF THE INVENTION

Hence one object of this invention is to provide a renewal method and renewal apparatus for IC cards having biometrics authentication functions, to execute IC card renewal in a secure environment while maintaining the secrecy of biometrics characteristic data.

Another object of this invention is to provide a renewal method and renewal apparatus for IC cards having biometrics authentication functions, to prevent re-registration of biometrics information by persons other than the individual in question, while maintaining the secrecy of biometrics characteristic data.

Still another object of this invention is to provide a renewal method and renewal apparatus for IC cards having biometrics authentication functions, to execute IC card renewal in a secure environment while preventing the release of biometrics characteristic data to third parties.

In order to attain these objects, an IC card renewal apparatus of this invention is an IC card renewal apparatus which performs renewal of an IC card in which biometrics characteristic data detected from a body is registered, biometrics characteristic data detected from the body is verified against the registered biometrics characteristic data, and biometrics authentication is performed. And the IC card renewal apparatus has a detection device to detect the biometrics data, an IC card reader/writer to read and write an old IC card to be renewed and a new IC card, and a control unit to extract the biometrics characteristic data from the output of the detection device and transfer the biometrics characteristic data to the old IC card. And the control unit uses the biometrics authentication functions of the old IC card to verify the registered biometrics characteristic data against the transferred biometrics characteristic data, and when the result enables satisfactory biometrics authentication, registers the extracted biometrics characteristic data in the new IC card.

Further, an IC card renewal method of this invention is an IC card renewal method to perform renewal of an IC card in which biometrics characteristic data detected from a body is registered, and which has functions to verify the registered biometrics characteristic data against biometrics characteristic data detected from the body and to perform biometrics authentication. The IC card renewal method has the steps of detecting the biometrics data and extracting biometrics characteristic data; of transmitting the extracted biometrics characteristic data to an old IC card to be renewed; of verifying the registered biometrics characteristics data against the transmitted biometrics characteristic data by using the biometrics authentication functions of the old IC card; and of registering the extracted biometrics characteristic data in a new IC card in response to satisfactory biometrics authentication based on the verification result,.

In this invention, it is preferable that, after registration in the new IC card, the control unit block the biometrics authentication functions of the old IC card.

In this invention, it is preferable that the control unit verify ownership information of the old IC card read by the IC card reader/writer against that of the new IC card, and confirm the legitimacy of the correspondence between the old IC card and the new IC card.

In this invention, it is preferable that the control unit confirm the legitimacy of the old IC card and of the new IC card from issuer information for the old IC card and for the new IC card, read by the IC card reader/writer.

In this invention, it is preferable that the control unit, after registration in the new IC card, delete the biometrics characteristic data in the old IC card.

In this invention, it is preferable that the detection device comprise an image capture device to capture images of the body of the user.

In this invention, it is preferable that the image capture device comprise a unit which captures images of blood vessels of the user.

In this invention, it is preferable that the IC card reader/writer comprise a first IC card reader/writer which reads/writes the old IC card, and a second IC card reader/writer which reads/writes the new IC card.

In this invention, it is preferable that the control unit, after registration of the biometrics characteristic data in the new IC card, again detect the biometrics data from the detection device, extract the biometrics characteristic data from the output of the detection device, transmit the biometrics characteristic data to the new IC card, and verify the biometrics characteristic data registered in the new IC card against the transmitted biometrics characteristic data.

In this invention, it is preferable that in the old IC card and in the new IC card, only the biometrics authentication functions of the old and the new IC cards access the biometrics characteristic data registered therein.

According to this invention, the individual's identity is confirmed by performing biometrics authentication using the biometrics authentication functions of the old IC card, so that the identity of the individual can be confirmed rigorously using an IC card with biometrics authentication functions, and illicit use at the time of renewal can be prevented. In particular, when an IC card is stolen, or a misplaced IC card is obtained by a third party, registration of the biometrics data of a person other than the user in question in a re-issued IC card can be prevented.

Further, if identity confirmation is satisfactory, the biometrics data obtained in biometrics authentication is registered in a new IC card the legitimacy of which has been confirmed. Consequently with a single image capture, biometrics data which has been confirmed to be that of the individual in question using the old IC card can be registered in the new IC card without being divulged to third parties, and biometrics data can easily be migrated to the new IC card.

DESCRIPTION OF THE PREFERRED EMBODIMENTS

Below, embodiments of the invention are explained in the order of a biometrics authentication system, biometrics authentication processing, an IC card renewal method, IC card renewal processing, other embodiments of IC card renewal apparatus, and other embodiments.

Biometrics Authentication System

Figure 1:
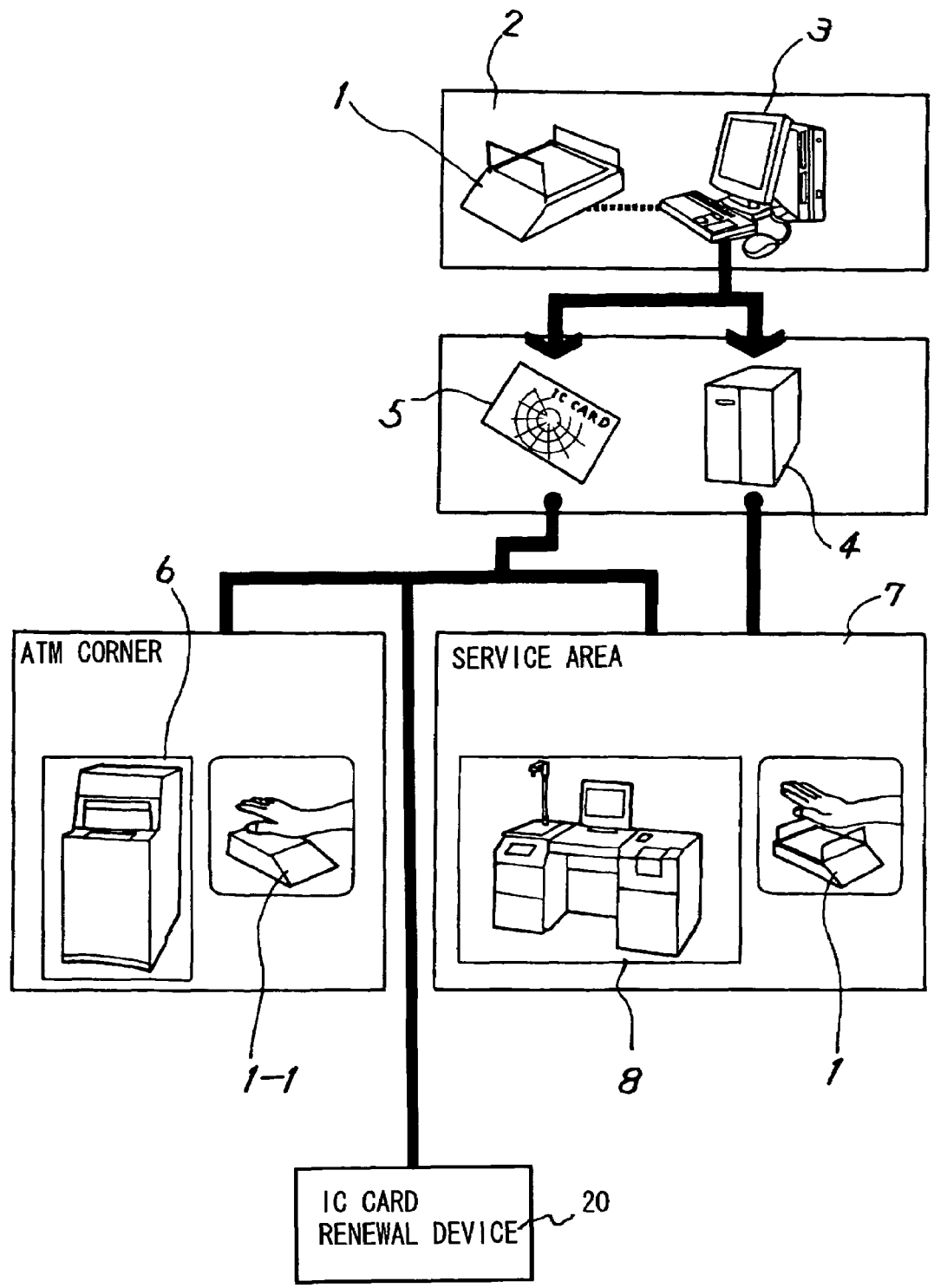
FIG. 1 shows the configuration of the biometrics authentication system of one embodiment of the invention.
Figure 2:
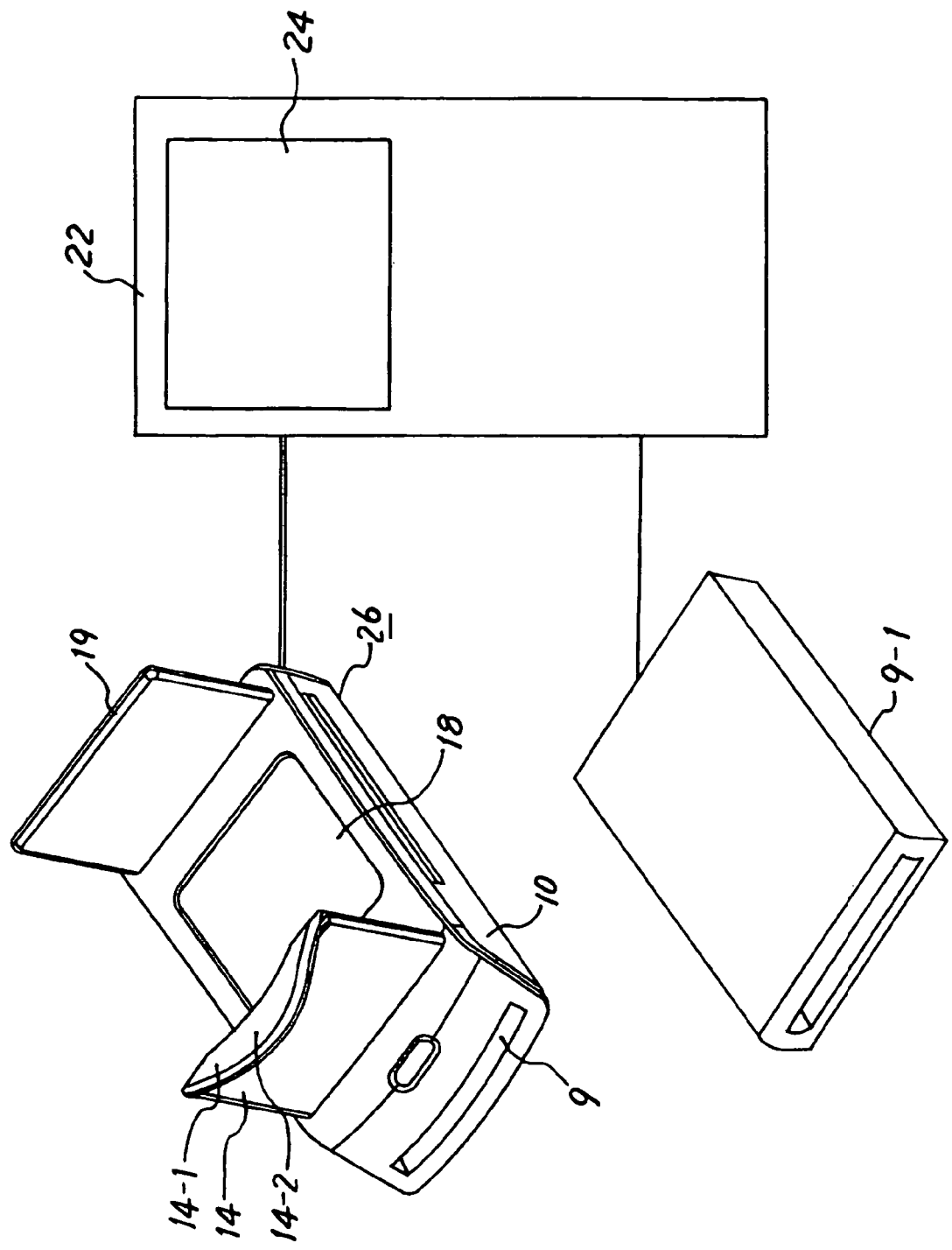
FIG. 2 shows the configuration of the IC card renewal apparatus of FIG. 1.
Figure 3:
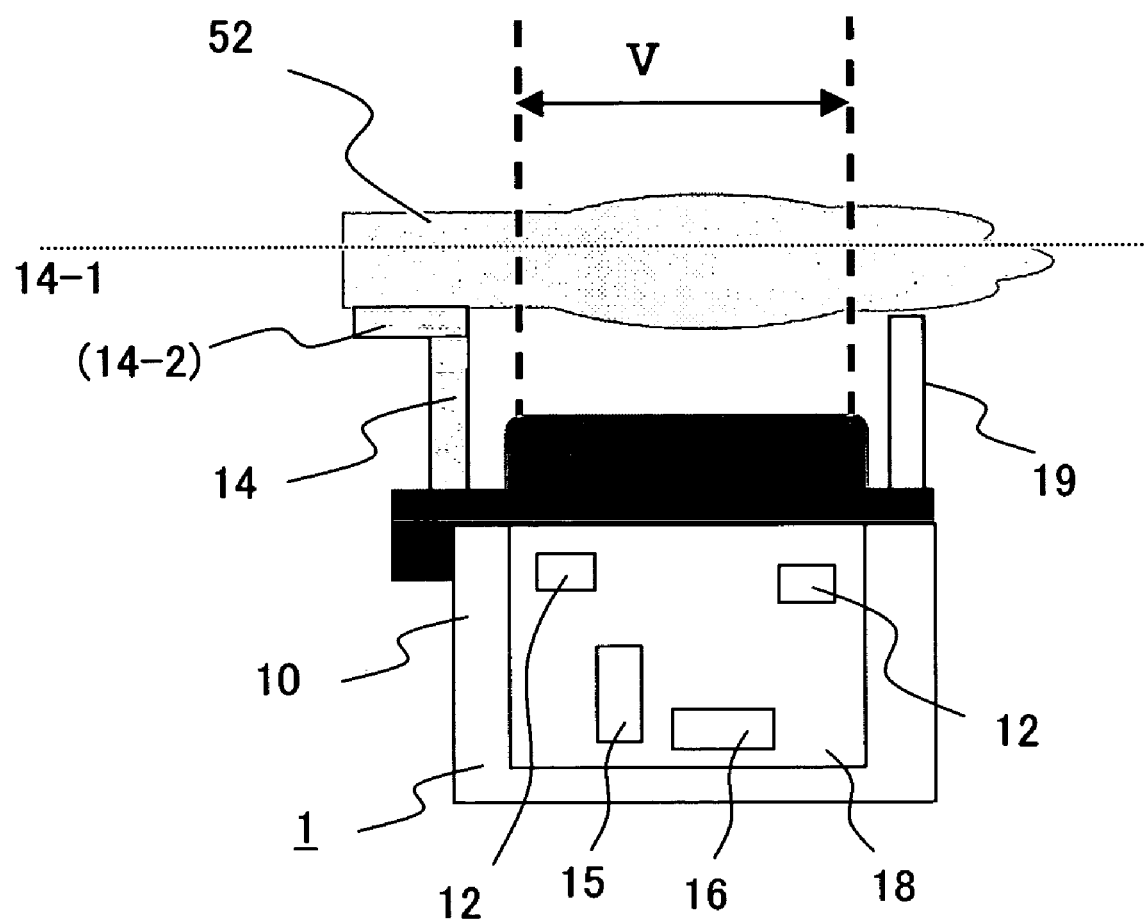
FIG. 3 shows the configuration of the image capture device of FIG. 1 and FIG. 2.
Figure 4:
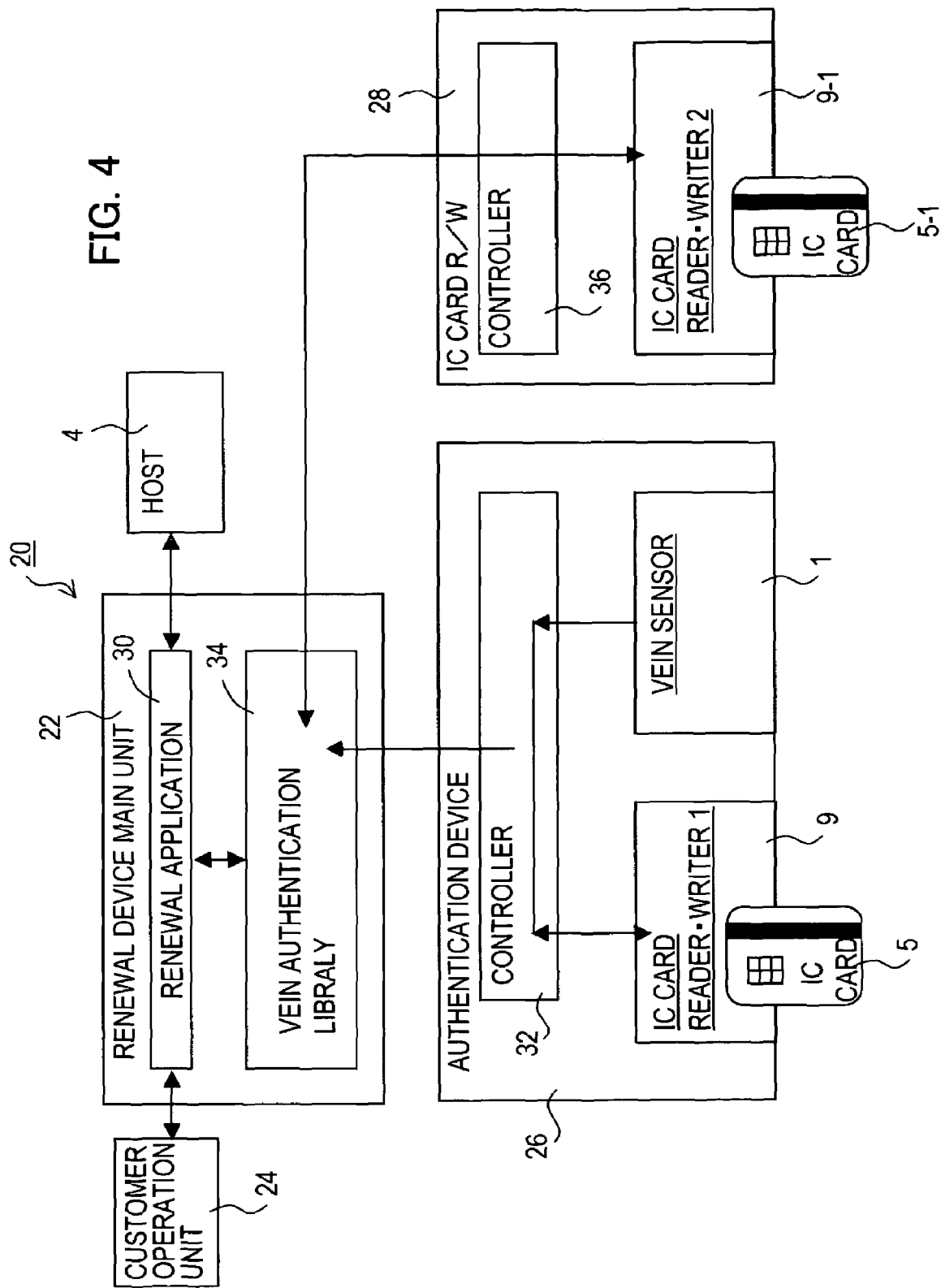
FIG. 4 is a block diagram of the IC card renewal apparatus of FIG. 2.
Figure 5:
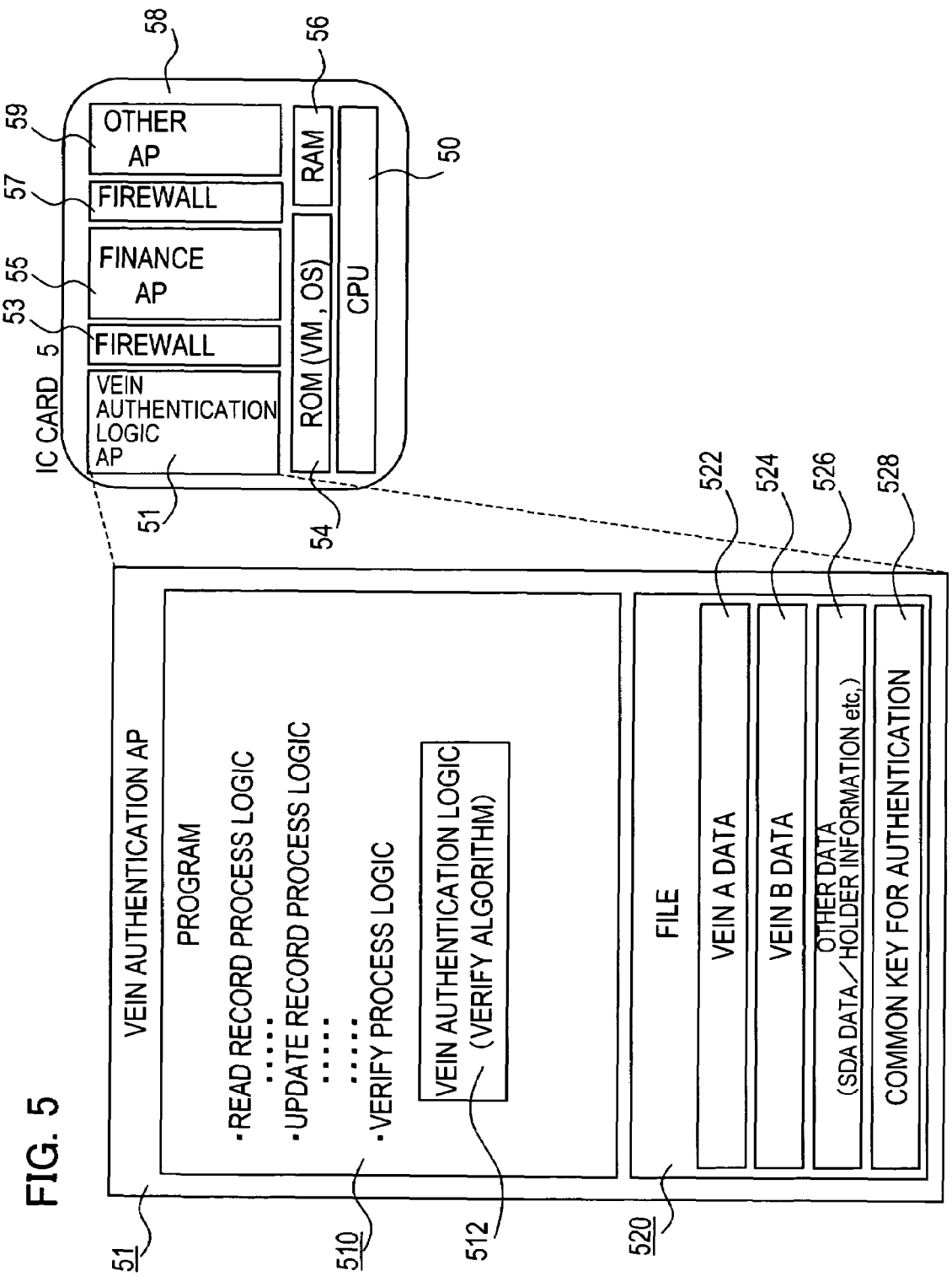
FIG. 5 shows the configuration of the IC card of FIG. 1 and FIG. 4.

FIG. 1 shows the configuration of the biometrics authentication system of one embodiment of the invention, FIG. 2 shows the configuration of the IC card renewal apparatus of FIG. 1, FIG. 3 shows the configuration of the image capture device of FIG. 1 and FIG. 2, FIG. 4 is a block diagram of the IC card renewal apparatus of FIG. 2, and FIG. 5 shows the configuration of the IC card of FIG. 1 to FIG. 3.

FIG. 1 shows, as an example of a biometrics authentication system, a palm vein authentication system in a financial institution. In the service area 2 of the financial institution are provided the palm image capture device 1 explained in FIG. 2 and FIG. 3 and a branch office terminal (for example, a personal computer) 3 connected thereto. A user requesting vein pattern authentication places his hand over the palm image capture device (hereafter the "image capture device") 1. The image capture device 1 reads the palm, and blood vessel image extraction processing is performed by the terminal 3 to extract the vein pattern, which is registered as vein data in the terminal 3.

This vein data is recorded in an individual card (for example, an IC card) 5 carried by the user. The server 4 is connected to a service area terminal 8 in the service area 7 of the financial institution, and the service area terminal 8 is connected to the image capture device 1.

In order to make a withdrawal or perform some other financial transaction in the service area 7 of the financial institution, the user inserts an IC card into the IC card reader explained in FIG. 2 and FIG. 4, and holds his hand over the image capture device 1 provided in the service area 7. The image capture device 1 reads the palm of the hand, and through blood vessel image extraction processing by the service area terminal 8, extracts the vein pattern. The service area terminal 8 performs verification processing to verify the vein pattern, as vein data, against vein data registered in the IC card 5, to authenticate the individual.

The server 4 is connected to an ATM (automated cash deposit/withdrawal machine) 6 of the financial institution; the ATM 6 can be used in transactions based on vein authentication. In order to make a withdrawal or perform some other financial transaction using the ATM 6, the user holds his hand over the image capture device 1-1 provided in the ATM 6. The image capture device 1-1 reads the palm of the hand. Similarly to the service area terminal 8, the ATM 6 extracts the vein pattern (blood vessel image), and verifies this as vein data against the vein data registered in the IC card 5 carried by the user, to authenticate the individual.

The server 4 is further connected to the IC card renewal apparatus 20 explained in FIG. 2 and FIG. 4.

FIG. 2 shows the configuration of the IC card renewal apparatus of FIG. 1. As shown in FIG. 2, the IC card renewal apparatus 20 has a renewal device main unit 22, an authentication device 26 having an IC card reader and palm image capture device (vein sensor), and IC card reader 9-1. The renewal device main unit 22 comprises for example a personal computer, and has a customer operation portion 24 comprising a display with a touch-screen.

The IC card reader/writer 9-1 performs reading and writing of the IC chip and magnetic stripe of an IC card 5 of the user, described below in FIG. 5. A security application module (SAM) is provided in the IC card reader/writer 9; only authenticated access is accepted, to maintain security of the IC card 5.

As shown in FIG. 2, the authentication device 26 is equipped with a sensor unit 18 substantially in the center of the main unit 10. On the forward portion (on the user side) of the sensor unit 18 is provided a front guide 14; on the rearward portion is provided a rear guide 19. The front guide 14 comprises a sheet of synthetic resin, transparent or substantially transparent.

The front guide 14 serves the purposes of guiding the hand of the user in the front and of supporting the wrist. Hence the front guide 14 provides guidance to the user to guide and support the wrist above the sensor unit 18. As a result, the attitude of the palm of the hand, that is, the position, inclination, and size over the sensor unit 18 can be controlled. The cross-sectional shape of the front guide 14 has a vertical body and, in the top portion, a horizontal portion 14-1 to support the wrist. A depression 14-2 is formed continuously in the center of the horizontal portion 14-1, to facilitate positioning of the wrist. The rear guide 19 serves the purpose of supporting the fingers of the hand.

As shown in FIG. 3, the sensor unit 18 is provided with an infrared sensor (CMOS sensor) and focusing lens 16 and a distance sensor 15 in the center; on the periphery thereof are provided a plurality of near-infrared light emission elements (LEDs) 12. For example, near-infrared light emission elements are provided at eight places on the periphery, to emit near-infrared rays upwards.

The readable region of this sensor unit 18 V is regulated by the relation between the sensor, focusing lens, and near-infrared light emission region. Hence the position and height of the front guide 14 are set such that the supported wrist is positioned in the readable region V.

When the hand 52 is extended with palm flat, the palm has maximum area, and moreover is flat, so that when the palm is subjected to image capture in the image capture region V of the sensor unit 18, an accurate vein pattern which can be used in registration and verification is obtained. When the distance from the sensor unit 18 to the palm is within a prescribed range, a sharp, focused image is obtained by the sensor 16 of the sensor unit 18.

Hence as shown in FIG. 3, by having the front guide 14 support the wrist 52 above the sensor unit 18, the position, inclination and height of the palm above the sensor unit 18 are made precise with respect to the image capture range of the sensor unit 18, and the user's hand can be guided and supported.

The palm image capture devices 1 and 1-1 in FIG. 1 have a similar configuration. In addition to the palm image capture device 1, the authentication device 26 of FIG. 2 further has an IC card reader/writer 9 provided to the main unit 10.

As shown in FIG. 4, the renewal device main unit 22 operates in concert with the customer operation unit 24, and has a renewal application 30 which performs renewal processing for an IC card 5, and a vein authentication library (program) 34 for vein authentication processing. The renewal application 30 is connected to the host (server) 4, and sends notifications of the renewal state.

The authentication device 26 has an IC card reader/writer 9, a vein sensor 1, and a controller (secure application module) 32. The IC card reader/writer 28 has an IC card reader/writer 9-1 and a controller (secure application module) 36.

FIG. 5 is a block diagram of an IC card having biometrics authentication functions of FIG. 1 through FIG. 4. As shown in FIG. 5, the IC card 5 has a CPU (Central Processor Unit) 50, ROM (Read-Only Memory) 54, RAM (Random Access Memory) 56, and an EEPROM 58. A ROM 54 stores an OS (Operating System) and similar.

A program 510 for the vein authentication application 51, a firewall 53, a financial application 55, a firewall for same 57, and other applications 59 and files 520 are stored in the EEPROM 58. The program 510 of the vein authentication application 51 has read record processing logic, update record processing logic, and verify processing logic. The verify processing logic comprises vein authentication logic (secondary verification algorithm) 512.

On the other hand, vein A portion data (described later using FIG. 9) and vein B portion data (described later using FIG. 9), written from a terminal at the time of vein registration, are stored in the files 520. The vein A portion data is referenced by the read record processing logic from the terminal at the time of vein verification (primary verification). The vein B portion data is referenced by the vein authentication logic 512 at the time of verify command processing (secondary verification), and is provided for secondary verification by the vein authentication logic 512.

Other data 526 is data in the well-known RSA (private key/public key) format used in IC cash cards, and is referenced by the read record processing logic from the terminal during card authentication (SDA processing).

Figure 6:
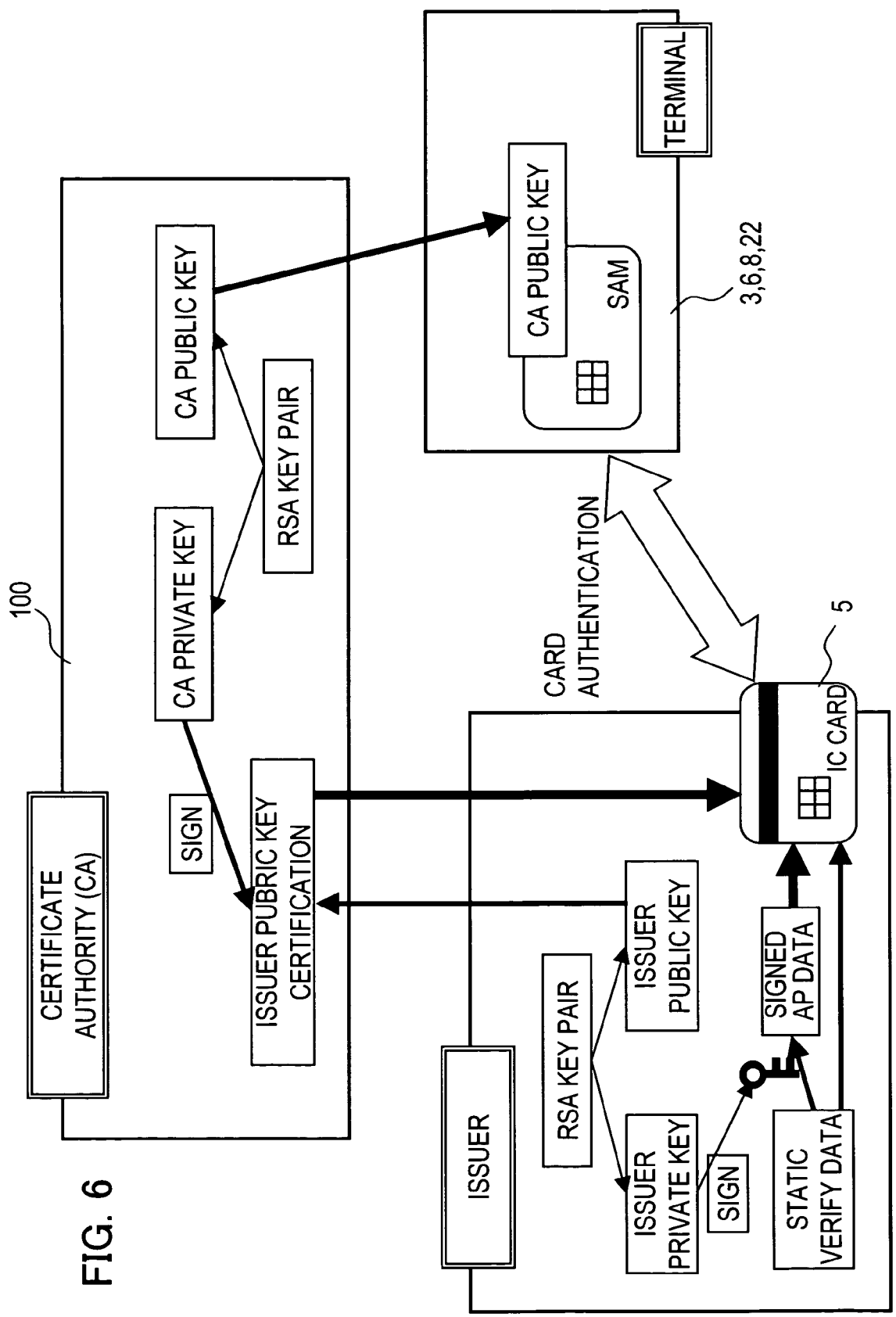
FIG. 6 explains the authentication data of the IC card of FIG. 5.

That is, as shown in FIG. 6, the other data 526 comprises SDA data and an account number and other information for the carrier. The SDA data comprises a static authentication data, a signed application data encrypted a static authentication data using the issuer secret key, and an issuer public key certificate which is the issuer public key encrypted using the CA private key of the certificate authority (CA) 100 and issued by the certificate authority 100. The terminals 3, 6, 8, 22 perform offline authentication to confirm that this SDA data is issued by the legitimate issuer of the card.

Figure 7:
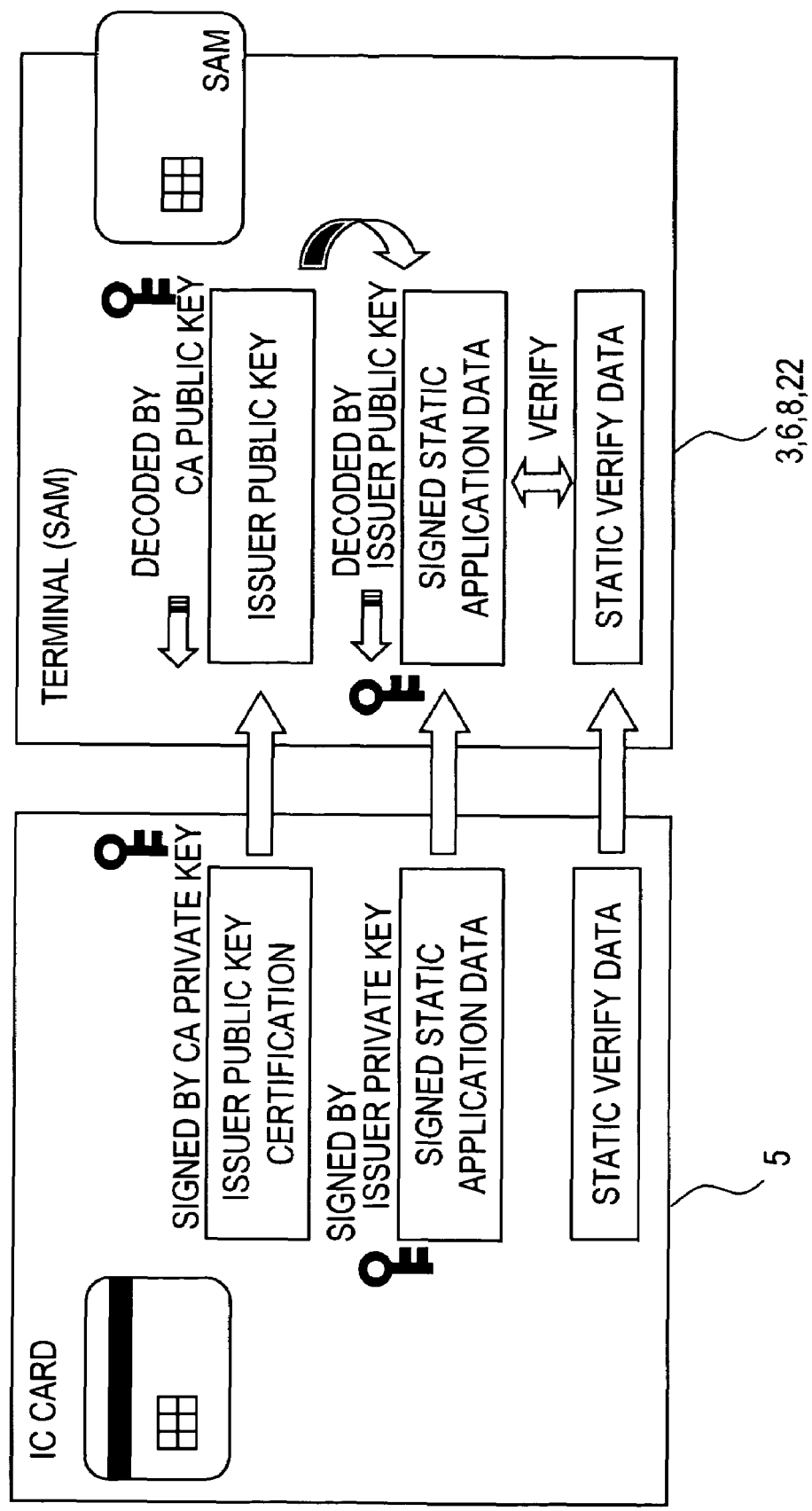
FIG. 7 explains the authentication method of the IC card of FIG. 6.

As shown in FIG. 7, an issuer public key certificate encrypted using the CA private key and read from the IC card 5 is decrypted by a terminal 3, 6, 8, or 22 using the CA public key, to retrieve the issuer public key. Next, the signed application data encrypted using the issuer private key, which is read from the IC card 5, is decrypted by the terminal 3, 6, 8 or 22 using the retrieved issuer public key, to retrieve the static authentication data. And, static authentication data read from the IC card 5 is compared with the decrypted static authentication data to verify legitimacy. By this means, the terminal confirms in offline processing that a card was issued by a legitimate issuer.

On the other hand, a shared key is used in a DES authentication method of mutual authentication of an IC card 5 and a terminal (or host); in order to authenticate the terminal, authentication data is encrypted by the terminal using the shared key to obtain authentication code, and this authentication code is transmitted to the IC card 5. At the IC card 5, the authentication data is encrypted using the shared key and the result compared with the authentication code, to verify the legitimacy of the authentication code.

In order to authenticate the IC card, authentication data is encrypted by the IC card using the shared key to obtain authentication code, which is transmitted to the terminal; at the terminal, the authentication code is compared with the authentication code encrypted authentication data using the shared key, to verify the legitimacy of the authentication code.

Biometrics Authentication Processing Method

Figure 8:
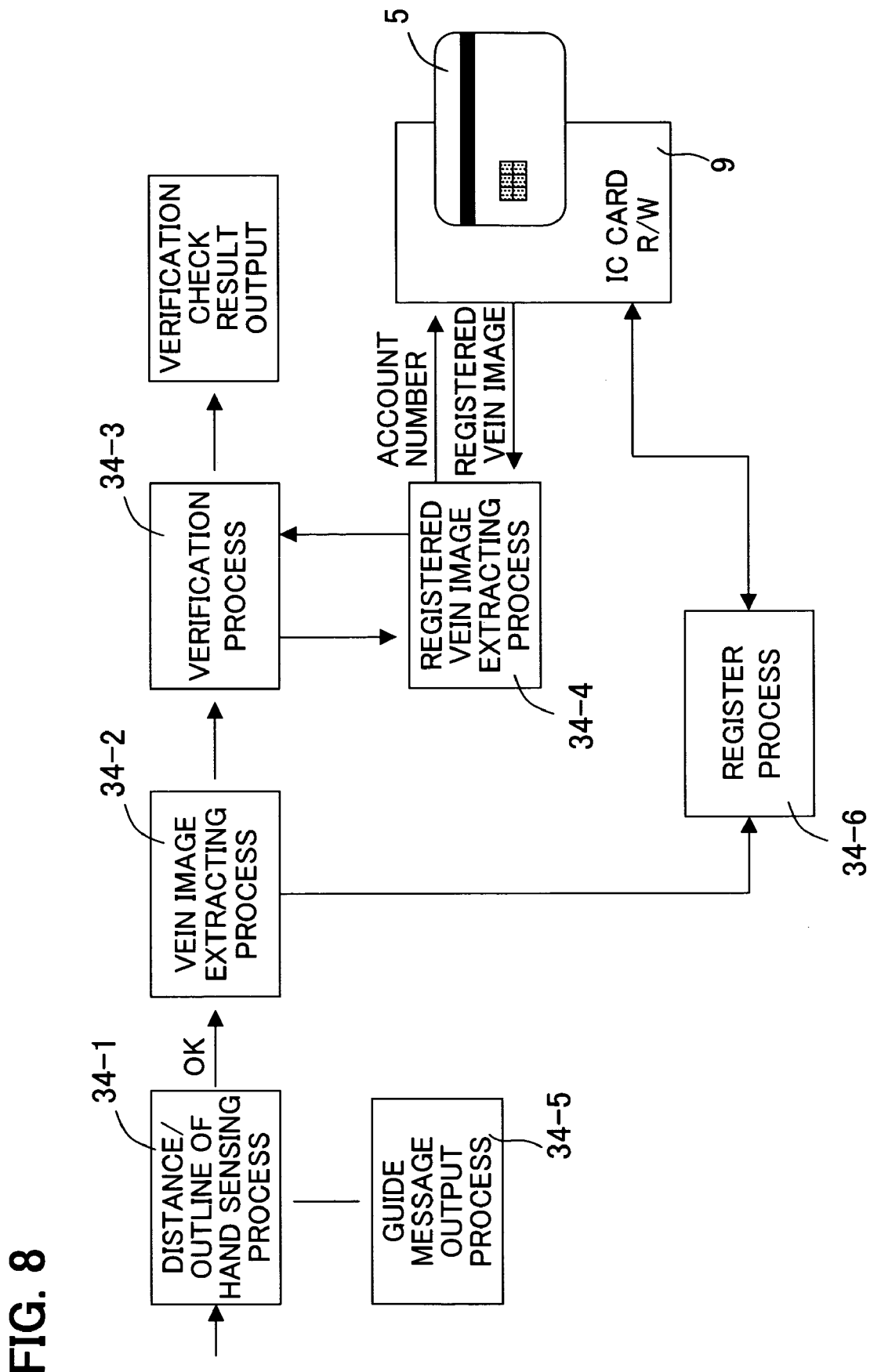
FIG. 8 is a functional block diagram of biometrics information registration/verification processing in one embodiment of the invention.
Figures 9, 10:
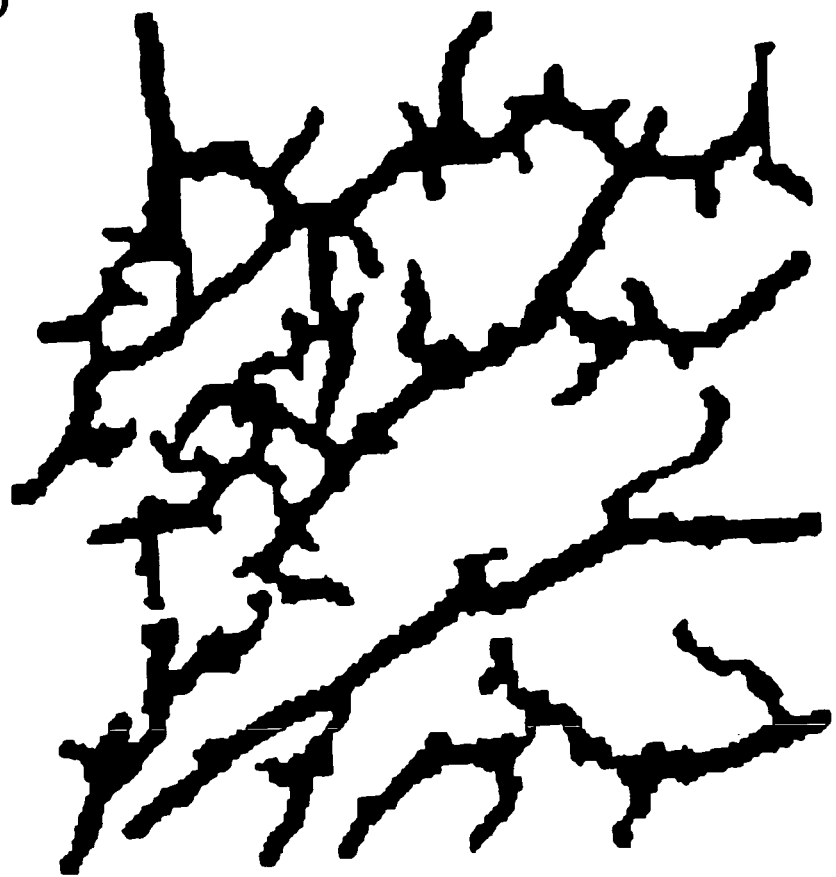
FIG. 9 explains the blood vessel image of FIG. 8.
FIG. 10 explains the blood vessel image data of FIG. 9.
Figure 11:
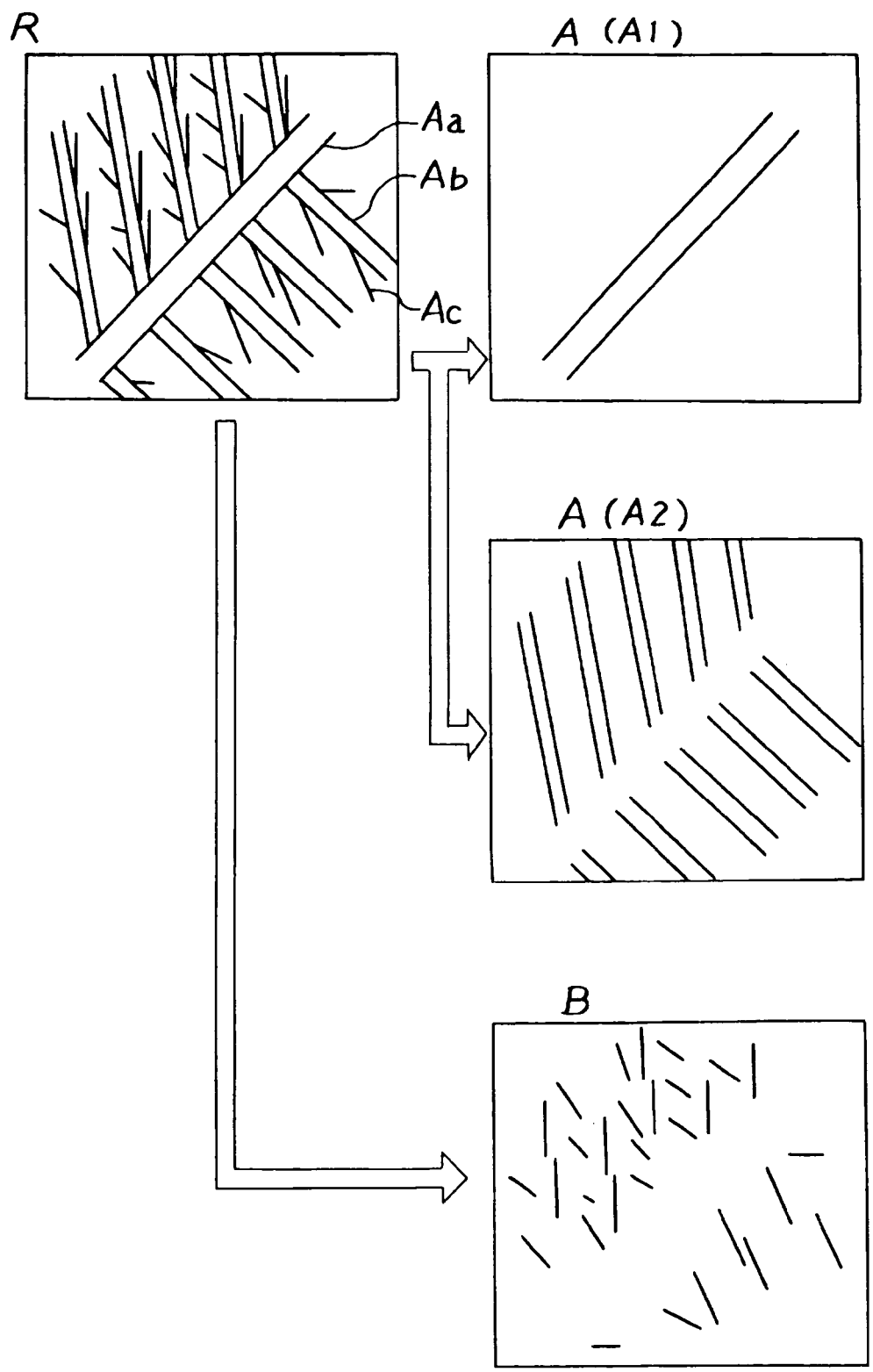
FIG. 11 explains the characteristic data A, B of FIG. 8.

FIG. 8 is a block diagram of biometrics authentication processing in one embodiment of the invention, FIG. 9 explains the detected blood vessel image of FIG. 8, FIG. 10 explains the verification processing of FIG. 8, and FIG. 11 explains the vein registration data A, B for verification processing.

As shown in FIG. 8, the service area terminals 3 and 8 connected to the image capture device 1 and the authentication library 34 of the IC card renewal apparatus 20 execute the series of registration and verification processing 34-1 to 34-6. As described below, the CPU 50 of the IC chip in the IC card 5 also performs verification processing (secondary verification) 34-3.

Distance/hand outline detection processing 34-1 receives the distance measured by the distance sensor 15 of the image capture device 1, 1-1, judges whether the palm of the hand or other object is at a distance in a prescribed range from the sensor unit 18 and also detects the outline of the hand from the image captured by the sensor unit 18, and judges from the outline whether the image can be used in registration and verification processing. For example, the palm may not appear sufficiently in the image.

Guidance message output processing 34-5 outputs to the display of the service area terminals 3, 8 and the customer operation unit 24 of the IC card renewal apparatus 20 a message guiding the palm to the left or right, forward or backward, upward or downward, when the distance measured by the distance sensor 15 indicates that the hand is outside the image capture range, or when hand outline extraction indicates that the image cannot be used in registration and verification processing. By this means, the hand of the user is guided into position over the image capture device 1.

Blood vessel image extraction processing 34-2 extracts a vein image from the image of the hand when hand outline detection processing 34-1 judges that an image has been captured with the hand held correctly. That is, grayscale data of the image of the palm such as that of FIG. 10 is obtained through differences in reflectivity, as explained above with reference to the prior art. The vein pattern image is an image like that shown in FIG. 9; the data is grayscale data such as that in FIG. 10.

Registered blood vessel image search processing 34-4 retrieves registered blood vessel image data A corresponding to the individual ID (account number) from the storage portion 56 of the IC chip in the IC card 5 shown in FIG. 1, FIG. 4 and FIG. 5. Verification processing 34-3 compares the blood vessel image data N1 extracted in blood vessel image detection processing 34-2 with the registered blood vessel image data N2 as shown in FIG. 10, performs verification processing, and outputs the verification result.

As shown in FIG. 11 and can also be seen from FIG. 9, plain data (blood vessel image data) R can be classified into trunks Aa, thick branches Ab, and thin branches Ac connected to thick branches. Trunks A1 and thick branches A2 are divided into comparatively coarse characteristic data A, and thin branches Ac are divided into comparatively fine characteristic data B, to create registered data A, B. Registered data A is comparatively coarse and so does not show fine characteristics, but represents rough characteristics. Registered data B is comparatively fine, and so represents fine characteristics.

Registration processing 34-6 divides the detected blood vessel image data into comparatively coarse-level blood vessel image data A and comparatively fine-level blood vessel image data B, and stores the data on the IC chip 50 of the IC card 5 via the IC card reader/writer 9.

That is, the authentication library 34 of the terminal references the vein A portion data of the IC card 5 explained in FIG. 5 and performs verification (called primary verification). On the other hand, the vein authentication logic 512 of the vein authentication application 510 of the IC card 5 explained in FIG. 5 references the B portion data on the IC card 5 and performs verification (called secondary verification).

In this blood vessel image authentication system, simultaneously maintaining the secrecy of the blood vessel image data and reliability of IC card renewal is effective for secure renewal of an IC card having biometrics authentication functions.

IC Card Renewal Method

Figure 12:
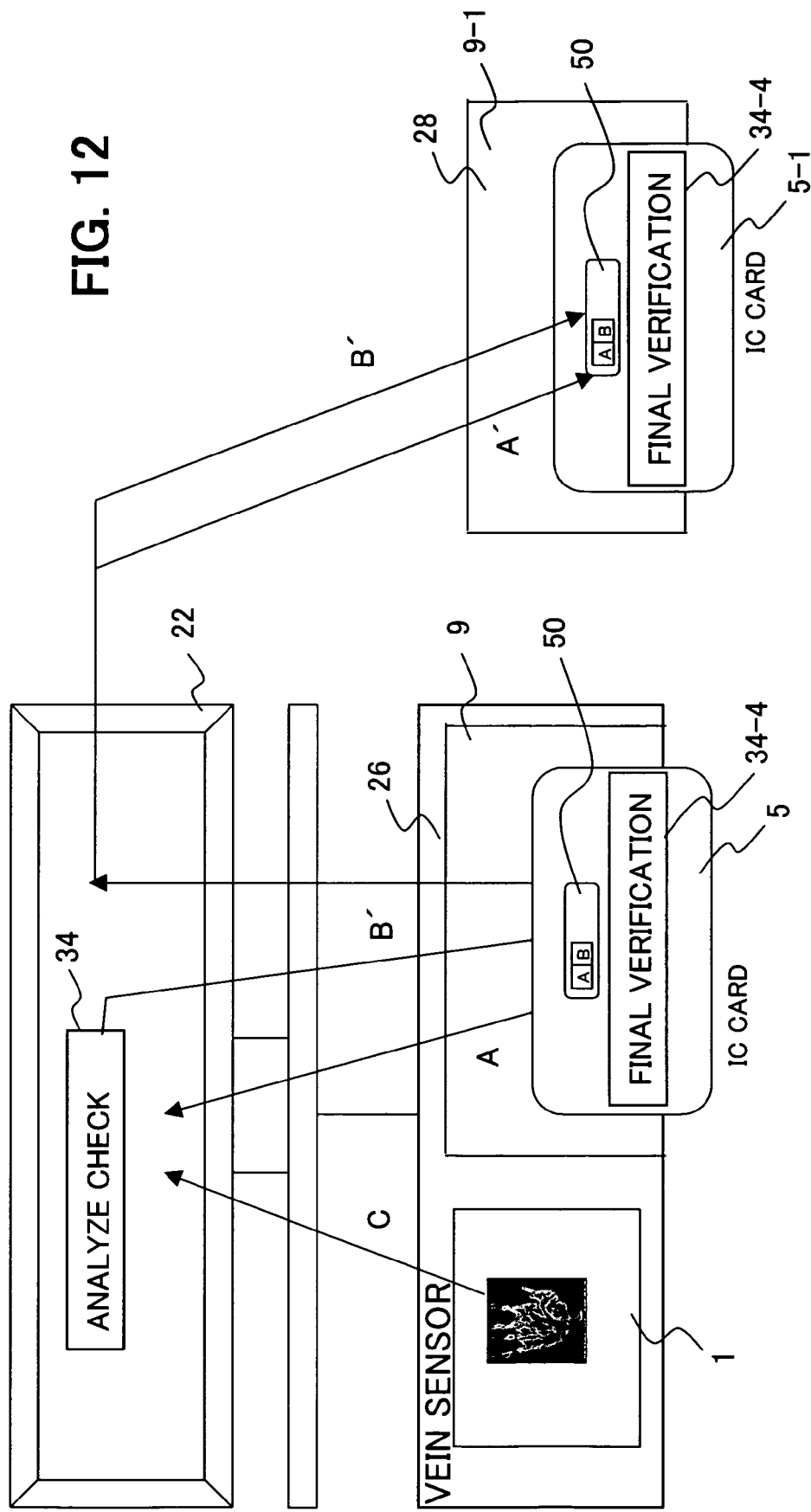
FIG. 12 explains IC card renewal processing in one embodiment of the invention.

FIG. 12 explains the procedure of the IC card renewal method in one embodiment of the invention, and presents an example using the IC card renewal apparatus 20 of FIG. 1, FIG. 2 and FIG. 4.

(1) The user inserts an IC card 5 with biometrics authentication functions, the expiration date of which has passed (called an old IC card), and a re-issued IC card with biometrics authentication functions (called a new IC card) 5-1, into the IC card reader/writers 9 and 9-1 respectively. The respective IC card reader/writers 9 and 9-1 monitor removal of the IC cards after IC card insertion until completion of the re-registration processing, and if either of the IC cards is removed, interrupts processing.

(2) First, the renewal application 30 of the terminal 22 executes card authentication of the old IC card 5 using the RSA method explained above using FIG. 6 and FIG. 7, via the IC card reader/writer 9, to confirm the legitimacy of the card. Similarly, the terminal 22 performs card authentication of the new IC card 5-1 using the RSA method explained above using FIG. 6 and FIG. 7 via the IC card reader/writer 9-1, to confirm the legitimacy of the card.

(3) Next, the renewal application 30 of the terminal 22 reads and compares the individual information (account number and similar of the holder data in FIG. 5) in the old IC card 5 and the individual information (account number and similar of the holder data in FIG. 5) in the new IC card 5-1, via the IC card reader/writers 9, 9-1. By this means, it is confirmed that the new IC card 5-1 was re-issued to replace the old IC card 5. It is also confirmed by the terminal 22, through the IC card reader/writer 9, that biometrics data has not been registered in the new IC card 5-1.

(4) Next, the renewal application 30 of the terminal 22 uses the vein sensor 1 of the authentication apparatus 26 for image capture of biometrics data, to obtain palm blood vessel image data C. The renewal application 30 of the terminal 22 uses the authentication library (analysis and verification) 34 to verify the blood vessel image data C against the vein data A of the old IC card 5. If the verification result is satisfactory, vein data B' created from the blood vessel image data C is transmitted to the old IC card 5, and the vein authentication logic of the old IC card 5 verifies the data B' against the vein B portion data B in the old IC card 5. By this means, biometrics authentication is performed using the old IC card 5.

(5) When individual authentication is accomplished through biometrics authentication using the old IC card 5, biometrics data is registered in the new IC card 5-1, based on the blood vessel image data C captured in (4). That is, vein data A', B' created from the blood vessel image data C is transmitted to the IC card reader/writer 9-1, and through update record processing of the new IC card 5-1, is written to the regions 522, 524 of the files 520.

(6) For verification, the renewal application 30 of the terminal 22 performs image capture of biometrics data using the vein sensor 1 of the authentication device 26, to obtain palm blood vessel image data C. The renewal application 30 of the terminal 22 uses the authentication library (analysis and verification) 34 to verify the vein data A created from the blood vessel image data C against the vein data A' of the new IC card 5-1. If the verification result is satisfactory, the vein data B' created from the blood vessel image data C is transmitted to the new IC card 5-1, and by means of the vein authentication logic 512 of the new IC card 5, is verified against the vein B portion data in the new IC card 5-1. By this means, biometrics authentication processing using the new IC card 5 is performed.

(7) When individual authentication is successful through biometrics authentication using the new IC card 5-1, the renewal application 30 of the terminal 22 deletes the biometrics data A, B on the old IC card 5 through the IC card reader/writer 9. For example, through update recording processing of the old IC card 5, nulls (all "1"s) are written to the regions 522, 524 of the files 520. Further, the renewal application of the terminal 22 renders the vein authentication functions of the old IC card 5 inactive through the IC card reader/writer 9. That is, the vein authentication application 51 is blocked. By this means, biometrics data is deleted from the old IC card 5, and moreover the vein authentication functions are rendered inactive. As a result, the old IC card 5 becomes a card which no longer has biometrics authentication functions.

Thus the old IC card and new IC card are first confirmed to be IC cards issued by a legitimate issuer, and the legitimacy of the IC card for renewal itself is confirmed. Next, through biometrics authentication using the old IC card, the person is confirmed to be the individual in question on the basis of biometrics authentication. Hence individual confirmation using an IC card with biometrics authentication functions can be performed rigorously, and illicit actions at the time of renewal can be prevented. In particular, when an IC card has been stolen or a misplaced IC card is obtained by a third party, registration of the biometrics data of a person other than the user in question in a re-issued IC card can be prevented.

If individual confirmation is successful, the biometrics data obtained in biometrics authentication is registered in the new IC card, the legitimacy of which has been confirmed. By this means, through a single image capture, and using the old IC card, biometrics data confirmed as that of the individual in question can be registered in the new IC card without divulgence of biometrics data to a third party, so that migration of biometrics data to a new IC card can be performed easily and reliably.

Trial authentication is performed to verify the biometrics data registered in the new IC card, and to verify the biometrics authentication functions of the renewed new IC card. If this verification is performed satisfactorily, the biometrics data in the old IC card is deleted and the vein authentication functions of the old IC card are rendered inactive, so that the old IC card 5 becomes a card no longer having biometrics authentication functions, and can no longer be used.

Consequently, the release of biometrics data as a result of IC card renewal can be prevented. In particular, if biometrics data or vein authentication functions remain on an old IC card, there may be opportunities for the release of biometrics data or reverse engineering of authentication functions, and the elimination of such opportunities is highly advantageous.

IC Card Renewal Processing

Figure 13:
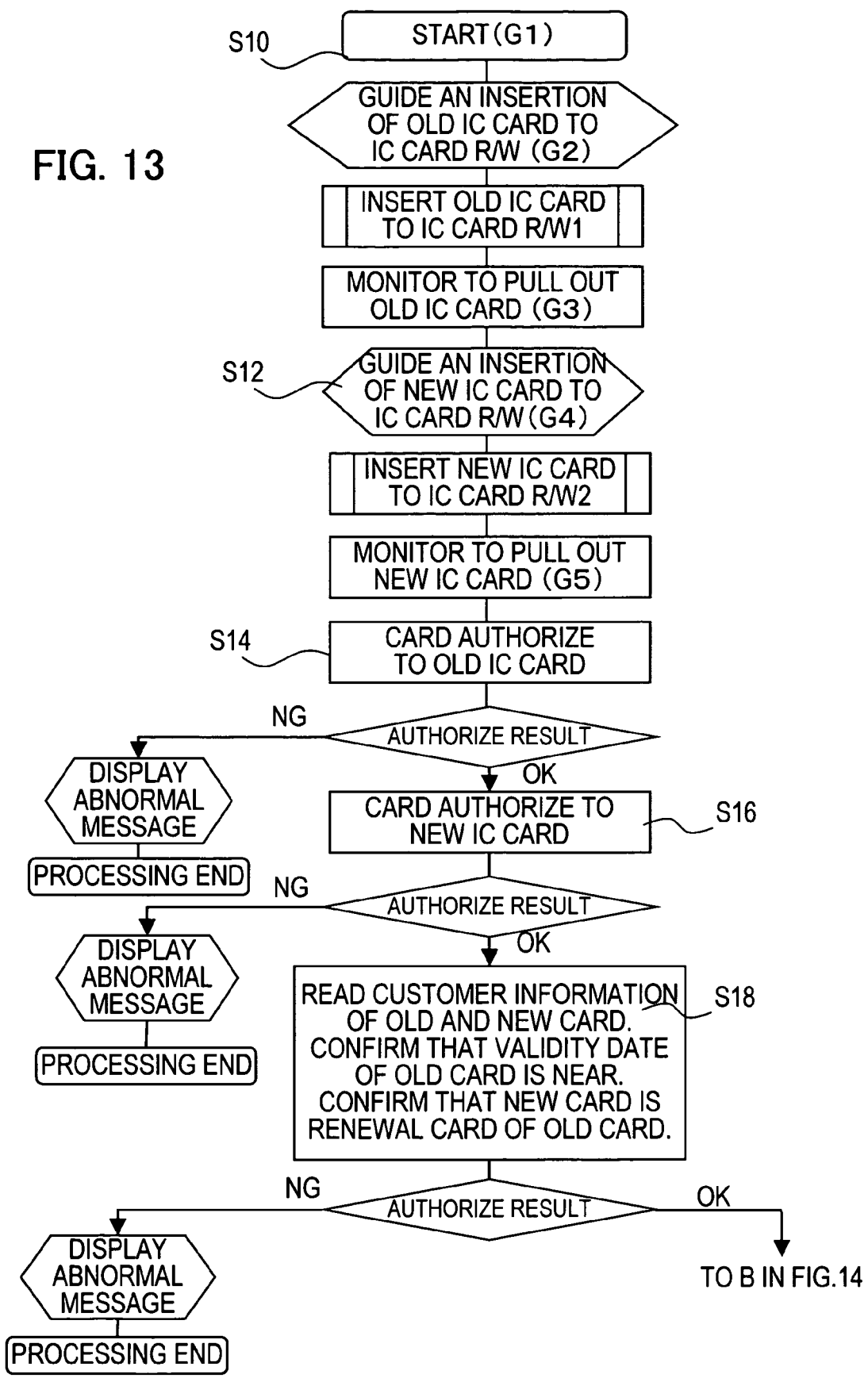
FIG. 13 is a (first) flow diagram of renewal processing for the IC card of FIG. 12.
Figure 14:
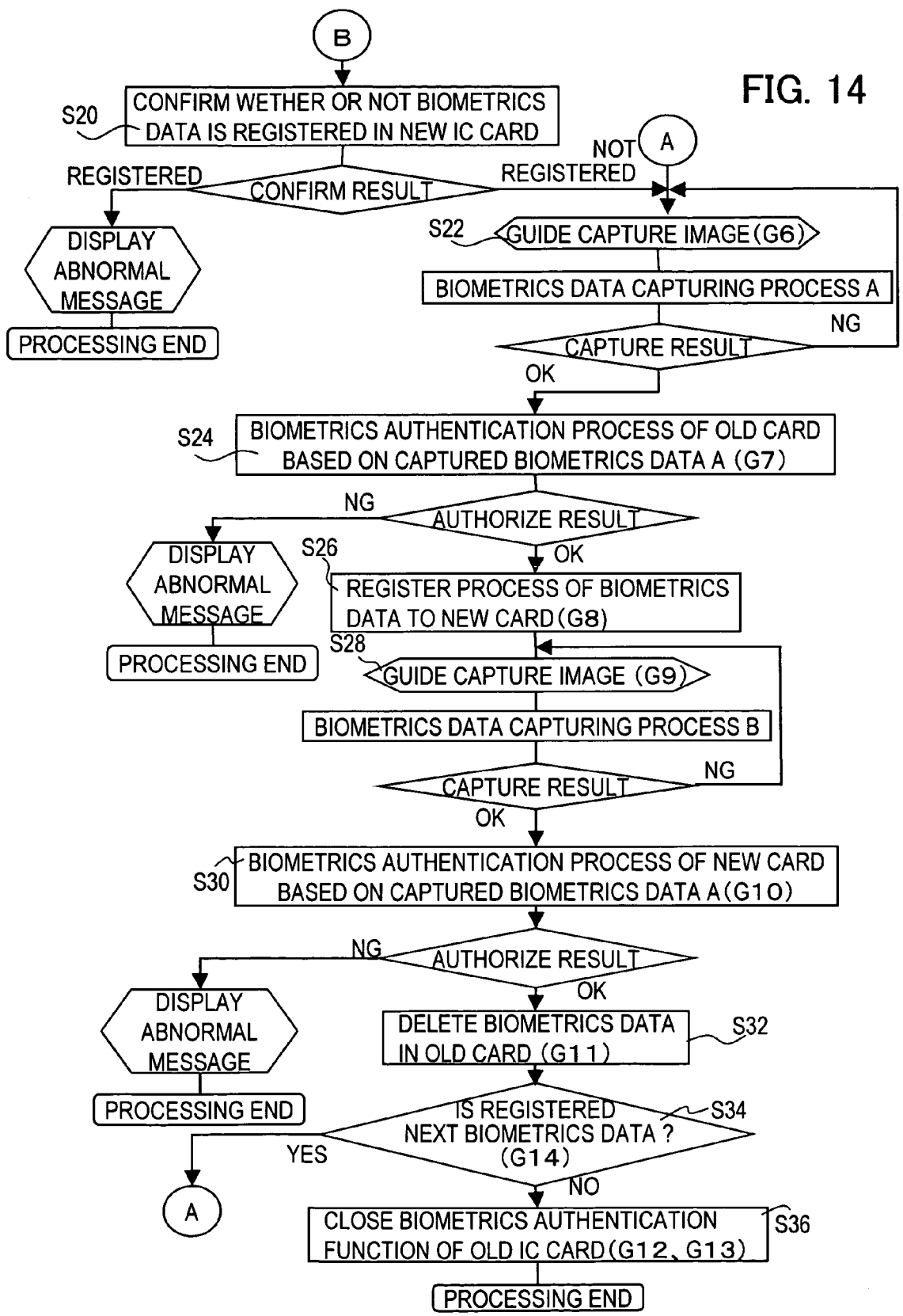
FIG. 14 is a (second) flow diagram of renewal processing for the IC card of FIG. 12.

Next, processing for the IC card renewal method explained in FIG. 12 is explained, using FIG. 13 through FIG. 16. FIG. 13 and FIG. 14 are IC card renewal processing flow diagrams, and FIG. 15 and FIG. 16 explain the guidance screens for this processing.

Figure 15:
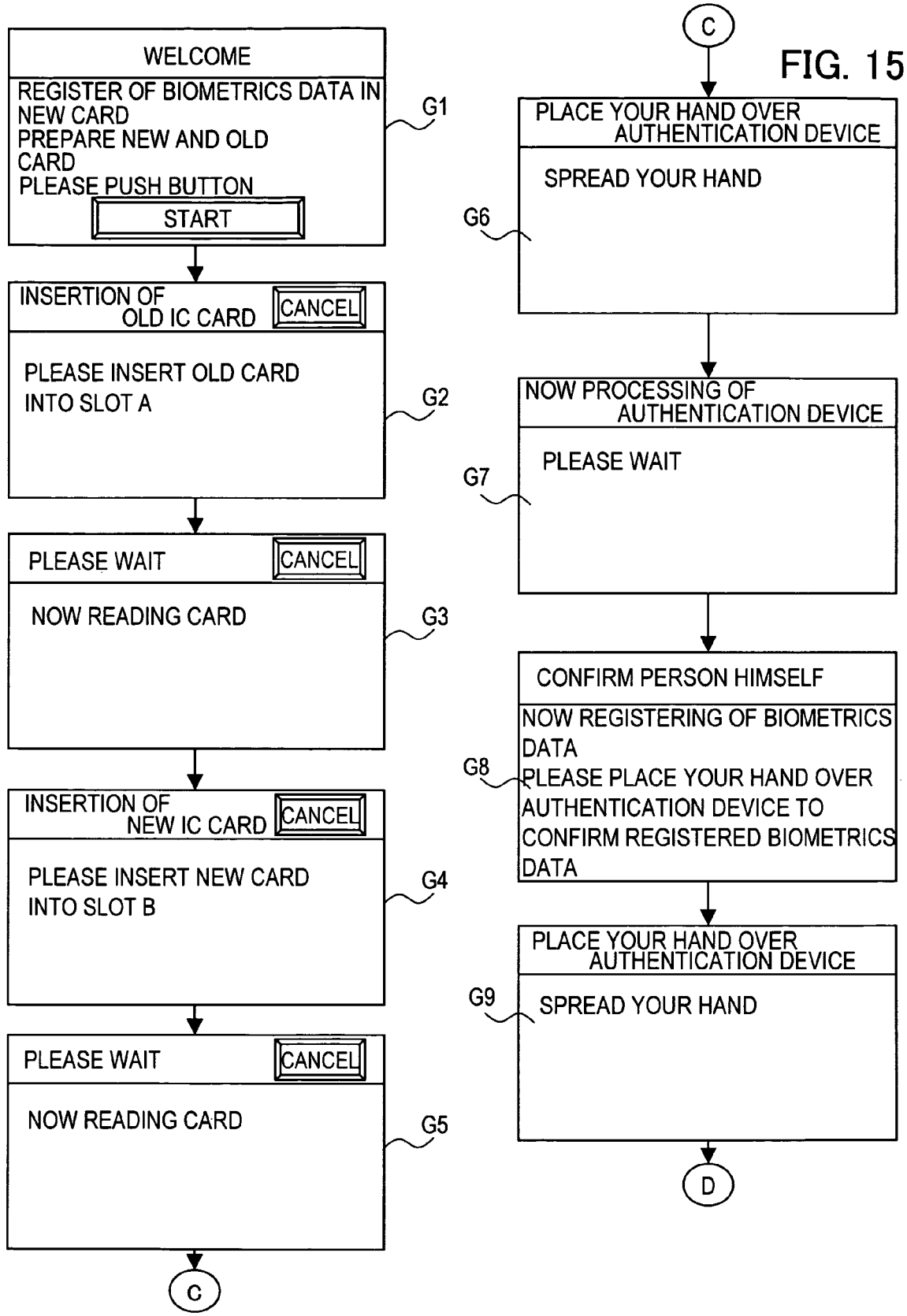
FIG. 15 is a (first) explanatory diagram of guidance screens for the renewal processing of FIG. 13 and FIG. 14.

(S10) The renewal selection screen G1 of FIG. 15 is displayed on the customer operation unit 24 of the IC card renewal apparatus 20. In order to request renewal, the user touches a start icon on the selection screen G1. As a result, renewal processing is begun. The user inserts an expired IC card 5 with biometrics authentication functions (an old IC card) into the IC card reader/writer 9, according to the old IC card insertion guidance screen G2 of FIG. 15. The IC card reader/writer 9 reads the contents (other than biometrics state protected by the biometrics authentication application) of the inserted old IC card 5, and displays the now-reading screen G3 of FIG. 15. The IC card reader/writer 9 monitors removal of the IC card from insertion of the IC card until completion of re-registration processing. If the IC card is removed, processing is interrupted.

(S12) Next, the user inserts an IC card 5-1 with biometrics authentication functions (a new IC card) into the IC card reader/writer 9-1, according to the new IC card insertion guidance screen G4 of FIG. 15. The IC card reader/writer 9-1 reads the contents (regions 526, 528 of the files 520) of the inserted new IC card 5-1, and displays the now-reading screen G5 of FIG. 15. The IC card reader/writer 9-1 monitors removal of the IC card from insertion of the IC card until the completion of re-registration processing. If the IC card is removed, processing is interrupted.

(S14) Next, the renewal application 30 of the terminal 22 performs card authentication of the old IC card 5 using the RSA method explained above using FIG. 6 and FIG. 7, via the IC card reader/writer, to confirm the legitimacy of the card. If the authentication result is not satisfactory, an error message is displayed on the customer operation unit 24, and processing ends.

(S16) If the legitimacy of the old IC card 5 is confirmed satisfactorily, then card authentication of the new IC card 5-1 is similarly performed by the terminal 22 using the RSA method explained in FIG. 6 and FIG. 7 above, via the IC card reader/writer 9-1, to confirm the legitimacy of the card. If the authentication result is not satisfactory, an error message is displayed on the customer operation unit 24, and processing ends.

(S18) Next, the renewal application 30 of the terminal 22 confirms, from individual information (the expiration date in the holder data of FIG. 5) in the old IC card 5 read by the IC card reader/writer 9, that the expiration date of the old IC card 5 has passed or is about to pass. Further, the renewal application 30 compares the individual information (account number and similar) of the old IC card with the individual information (account number in the holder data of FIG. 5 and similar) of the new IC card 5-1. By this means, the new IC card 5-1 is confirmed to be a card re-issued to replace the old IC card 5. If the confirmation result is not satisfactory, an error message is displayed on the customer operation unit 24, and processing ends.

(S20) If on the other hand the confirmation result is satisfactory, processing advances to FIG. 14, and the terminal 22 confirms, through the IC card reader/writer 9, that biometrics data has not been registered in the new IC card 5-1. If data has been registered, an error message is displayed on the customer operation unit 24, and processing ends.

(S22) Next, if no data has been registered, the renewal application 30 of the terminal 22 displays the palm guidance screen G6 of FIG. 15, guiding the user to place his palm over the vein sensor 1 of the authentication device 26. An image of the palm is then captured by the vein sensor 1, the image capture processing 34-1 explained in FIG. 8 is performed, and if the image capture result is not satisfactory, image capture guidance is performed through the guidance message processing 34-5.

(S24) If the image capture result is satisfactory, palm blood vessel image data C is obtained from the blood vessel image extraction processing 34-2 of FIG. 8. The renewal application 30 of the terminal 22 verifies the vein data A' created from blood vessel image data C against the vein data A of the old IC card 5, using the authentication library (analysis and verification) 34. If the verification result is satisfactory, vein data B' created from the blood vessel image data C is transmitted to the old IC card 5, and the vein authentication logic 512 of the old IC card 5 is used to verify the data B' against the vein B portion data B in the old IC card 5. By this means, biometrics authentication using the old IC card 5 is performed. If the authentication result is not satisfactory, an error message is displayed on the customer operation unit 24, and processing ends.

(S26) If the individual in question can be confirmed through biometrics authentication using the old IC card 5, the individual confirmation screen G8 is displayed on the customer operation unit 24, and based on the blood vessel image data C captured in step S24, biometrics data is registered in the new IC card 5-1. That is, the vein data A', B' created from the blood vessel image data C is transmitted to the IC card reader/writer 9-1, and through update recording processing of the new IC card 5-1, writing to the regions 522, 524 of the files 520 is performed.

(S28) For verification, the renewal application 30 of the terminal 22 displays the palm guidance screen G9 of FIG. 15, to guide the palm of the user over the vein sensor 1 of the image capture device 26. An image of the palm is captured by the vein sensor 1, the image capture processing 34-1 explained in FIG. 8 is performed, and if the image capture result is not satisfactory, image capture guidance is performed by the guidance message processing 34-5.

(S30) If the image capture result is satisfactory, palm blood vessel image data C is obtained through the blood vessel image extraction processing 34-2 of FIG. 8. The renewal application 30 of the terminal 22 displays the authentication processing screen G10 of FIG. 16 on the customer operation unit 24, and verifies the vein data A' created from blood vessel image data C against the vein data A1 of the new IC card 5-1 through the authentication library (analysis and verification) 34. If the verification result is satisfactory, vein data B' created from the blood vessel image data C is transmitted to the new IC card 5-1, and the vein authentication logic 512 of the new IC card 5-1 verifies the transmitted data against vein B Portion data B' registered in the new IC card 5-1. By this means, biometrics authentication processing using the new IC card 5 is performed. If the authentication result is not satisfactory, an error message is displayed on the customer operation unit 24, and processing ends.

Figure 16:
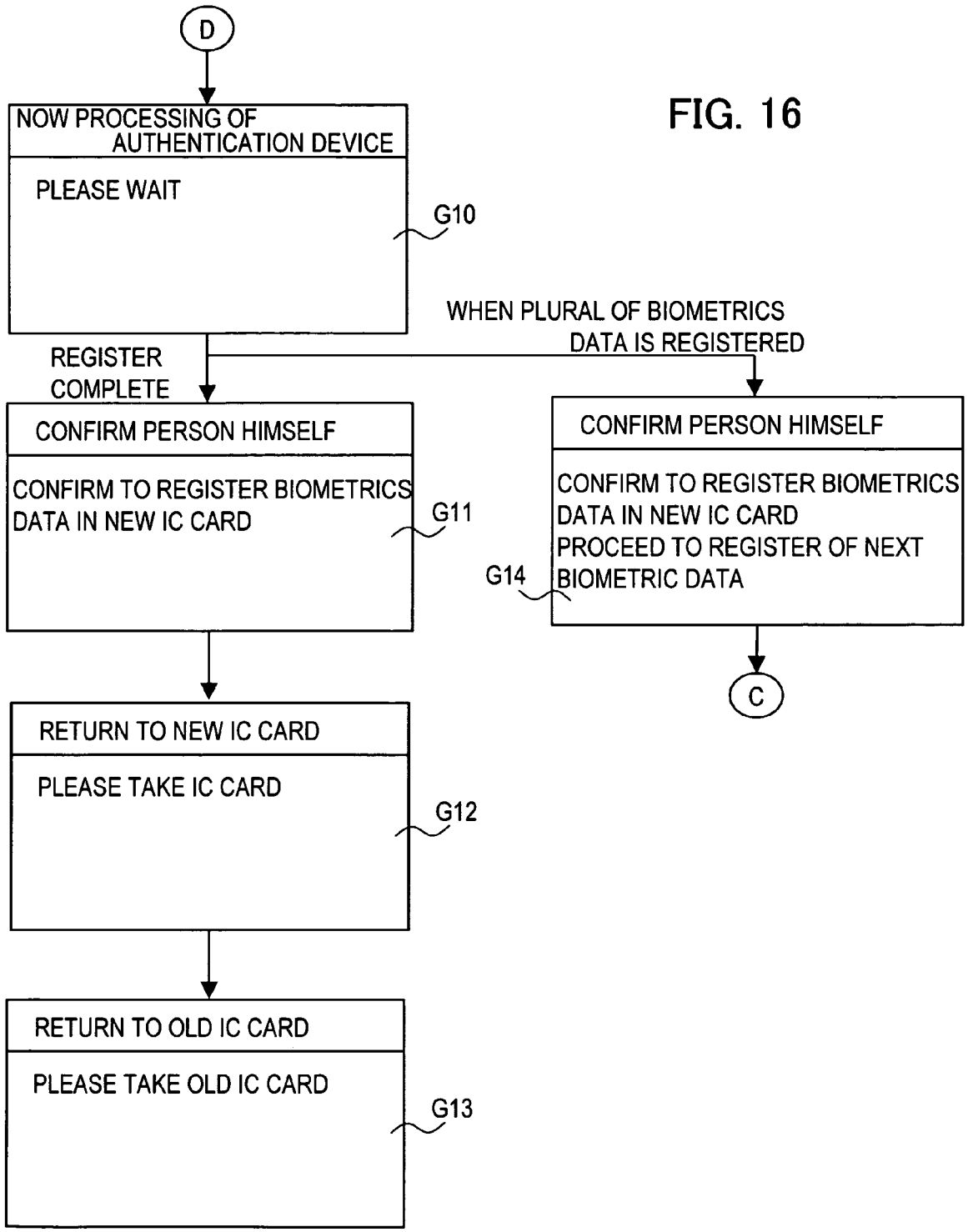
FIG. 16 is a (second) explanatory diagram of guidance screens for the renewal processing of FIG. 13 and FIG. 14.

(S32) Through biometrics authentication using the new IC card 5-1, the identity of the individual is confirmed, and the renewal application 30 of the terminal 22 displays the registration ended screen G11 of FIG. 16 on the customer operation unit 24, and then deletes the biometrics data A, B from the old IC card 5 through the IC card reader/writer 9. For example, update record processing by the old IC card 5 writes nulls (all "1"s) to the regions 522, 524 of the files 520.

(S34) The IC cards 5 and 5-1 can be used in biometrics authentication of an agent other than the individual who has received the consent of the individual; and consequently registration of a palm blood vessel image of the agent is possible. When such registration must be performed, by touching the biometrics data registration icon on the customer operation unit 24, the registration continuation screen G14 of FIG. 16 is displayed, and processing returns to step S22.

(S36) On the other hand, when there is no more biometrics data to be registered, the renewal application 30 of the terminal 22 renders inactive the vein authentication functions of the old IC card 5 via the IC card reader/writer 9. That is, the vein authentication application 51 is blocked. By this means, biometrics data is deleted from the old IC card 5, and moreover the vein authentication functions are rendered inactive. As a result, the old IC card 5 becomes a card not having biometrics authentication functions. The new IC card 5-1 return screen G12 is then displayed on the customer operation unit 24, and the new IC card 5-1 is returned from the IC card reader/writer 9-1. Next, the old IC card 5 return screen G13 is displayed on the customer operation unit 24, and the old IC card 5 is returned from the IC card reader/writer 9. Processing then ends.

In this way, a judgment is made as to whether the expiration date of the old IC card has passed or is about to pass, the card is confirmed to be an IC card issued legitimately by an issuer, and the continuity with the IC card to be used for renewal is confirmed based on the holder information in the old IC card and the new IC card.

Next, biometrics authentication using the old IC card is employed to confirm the identity of the individual through biometrics authentication. By this means, individual confirmation can be performed rigorously using an IC card with biometrics authentication functions. Hence when an IC card is stolen, or a misplaced card is obtained by a third party, registration of the biometrics data of a person other than the user in question in a re-issued IC card can be prevented.

If the individual confirmation is satisfactory, the biometrics data obtained in the biometrics authentication is registered in the new IC card the legitimacy of which has been confirmed. By this means, through a single image capture operation, and using an old IC card, biometrics data confirmed to be that of the individual can be registered in the new IC card without being divulged to third parties, and biometrics data can be easily and reliably migrated to the new IC card.

Further, in order to verify the biometrics data registered in the new IC card, trial authentication is performed, and the biometrics authentication functions of the renewed new IC card are verified. If the verification is satisfactory, the biometrics data in the old IC card is deleted and the vein authentication functions of the old card are rendered inactive, so that the old IC card 5 becomes a card not having biometrics authentication functions, and can no longer be used.

Consequently the release of biometrics data due to IC card renewal can be prevented. In particular, if biometrics data and vein authentication functions remain in the old IC card, there may be opportunities for the release of biometrics data or reverse engineering of authentication functions, and the elimination of such opportunities is highly advantageous.

Other Embodiments of IC Card Renewal Apparatus

Figure 17:
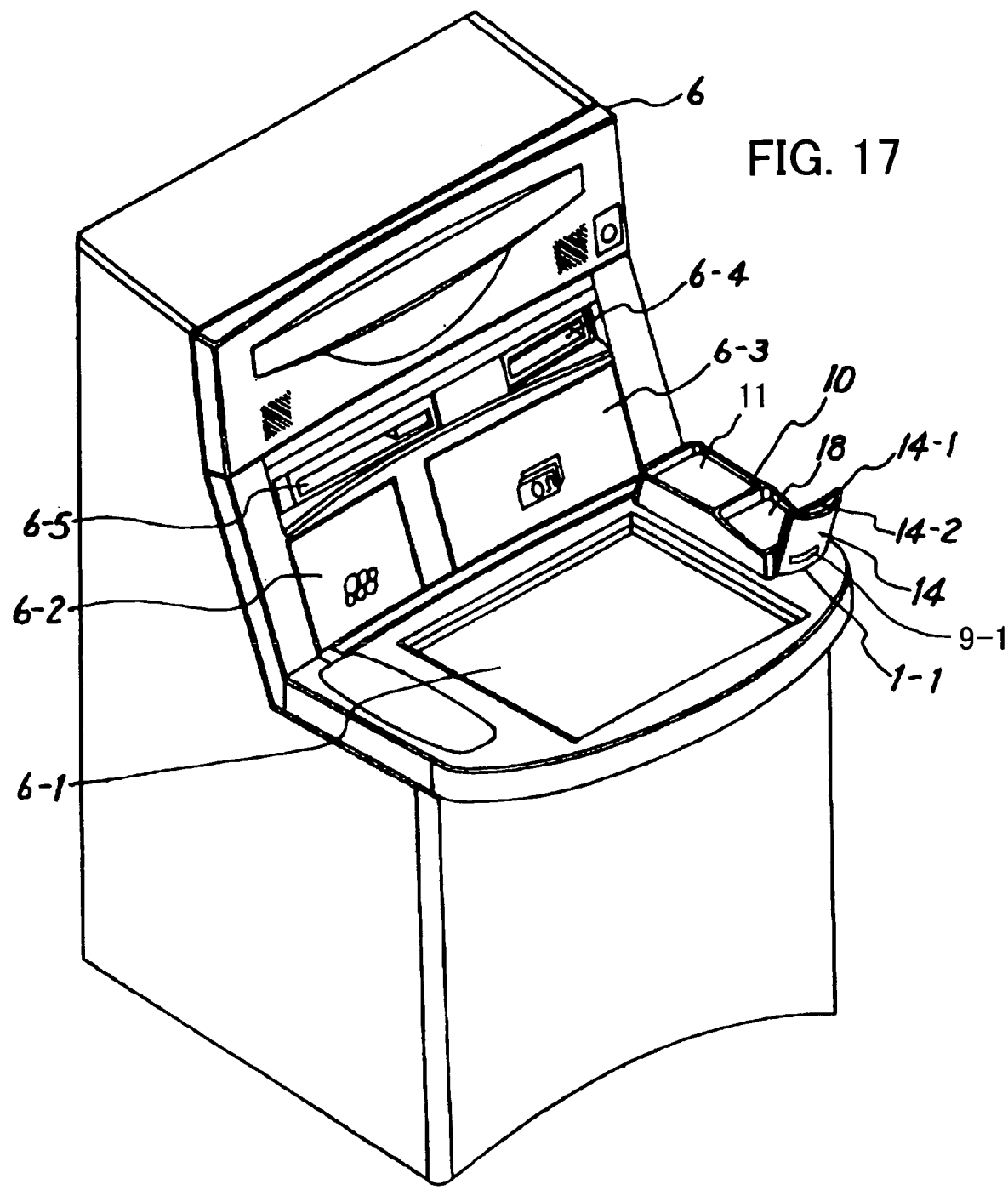
FIG. 17 shows the configuration of an IC card renewal apparatus of another embodiment of the invention.
Figure 18:
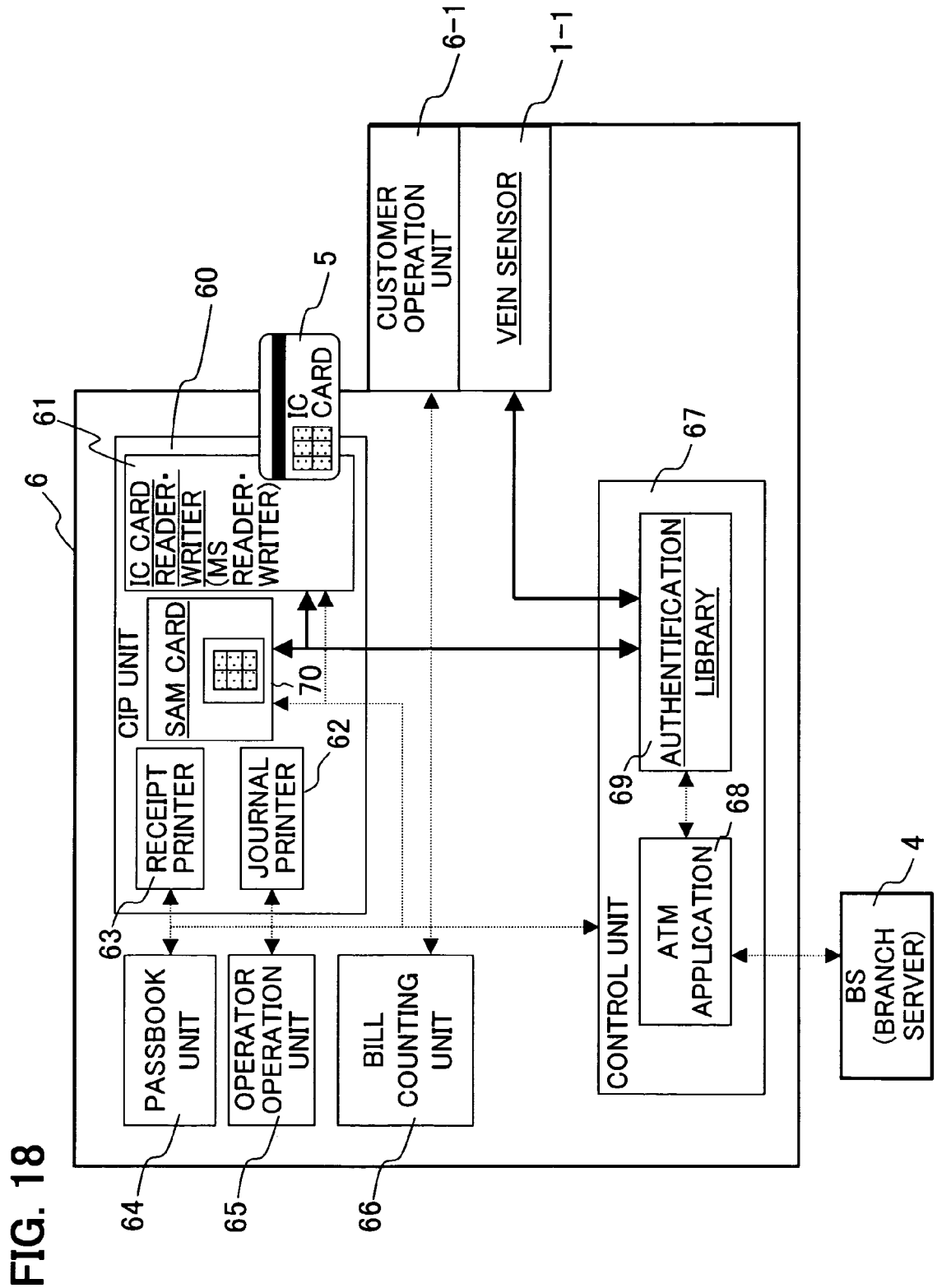
FIG. 18 is a block diagram of the IC card renewal apparatus of FIG. 17.

Next, other embodiments of IC card renewal using the automated transaction machine 6 of FIG. 1 are explained. FIG. 17 is an external view of the automated transaction machine of FIG. 1, and FIG. 18 is a block diagram of the automated transaction machine of FIG. 17.

As shown in FIG. 17, the ATM 6 has, on the front face thereof, a card insertion/ejection aperture 6-4; a bankbook insertion/ejection aperture 6-5; a paper currency insertion/dispensing aperture 6-3; a coin insertion/dispensing aperture 6-2; and a customer operation panel 6-1 for operation and display.

In this example, the image capture device 1-1 is provided on the side of the customer operation panel 6-1. The sensor unit 18 explained in FIG. 2 and FIG. 3 is mounted on the forward side of the main unit 10 of the image capture device 1. On the forward portion (on the user side) of the sensor unit 18 is provided a front guide 14. The front guide 14 comprises a sheet of synthetic resin, transparent or substantially transparent. In order to serve the purposes of guiding the hand of the user in the front and of supporting the wrist, the cross-sectional shape of the front guide 14 has a vertical body and, in the top portion, a horizontal portion 14-1 to support the wrist. A depression 14-2 is formed continuously in the center of the horizontal portion 14-1, to facilitate positioning of the wrist.

Further, the sensor unit 18 of the main unit 10 faces rearward and is inclined upward, and a flat portion 11 is provided therebehind. An IC card reader/writer 9-1 is provided on the main unit 10 of the image capture device 1-1.

As shown in FIG. 18, the ATM 6 has a CIP (Card Reader Printer) unit 60 having a card insertion/ejection aperture 6-4; a bankbook unit 64 having a bankbook insertion/ejection aperture 6-5; a paper currency/coin counter unit 66 having a paper currency insertion/dispensing aperture 6-3 and a coin insertion/dispensing aperture 6-2; an attendant operation unit 65; a control unit 67; a customer operation panel (UOP) 6-1 for operation and display; and an image capture device (vein sensor) 1-1 comprising an IC card reader/writer 9.

The CIP unit 60 has an IC card reader/writer 61 which reads and writes the magnetic stripe and IC chip of an IC card 5; a receipt printer 63 which records transactions on a receipt; a journal printer 62 which prints the history of transactions on journal forms; and a security access module (SAM) 70.

The bankbook unit 64 records transactions on pages of a bankbook, and when necessary turns the pages. The attendant operation unit 65 is for operations by an attendant, who can display the state and perform operations upon occurrence of a fault or during inspections. The paper currency/coin counting unit 66 validates, counts, and stores inserted paper currency and coins, and counts and dispenses paper currency and coins in the required quantities.

The control unit 67 communicates with the server 4, and has an ATM application 68 which controls ATM operation and an authentication library (program) 69 for authentication processing. A portion of this ATM application 68 acts in concert with the authentication library 69 to control biometrics authentication guidance screens of the UOP 6-1.

In the relations between FIG. 17 and FIG. 18 with FIG. 2 and FIG. 4, the IC card reader/writer 61 of FIG. 18 corresponds to the IC card reader/writer 9 of FIG. 2, and the IC card reader/writer 9-1 of FIG. 17 and FIG. 18 corresponds to the IC card reader/writer 9-1 of FIG. 2. And, the renewal application 30 of FIG. 4 is provided in the ATM application 68 of FIG. 18.

Further, the UOP 6-1 of FIG. 17 and FIG. 18 corresponds to the customer operation unit 24 of FIG. 2 and FIG. 4, while the authentication library 69 of FIG. 17 and FIG. 18 corresponds to the authentication library 34 of FIG. 2 and FIG. 4.

Figure 19:
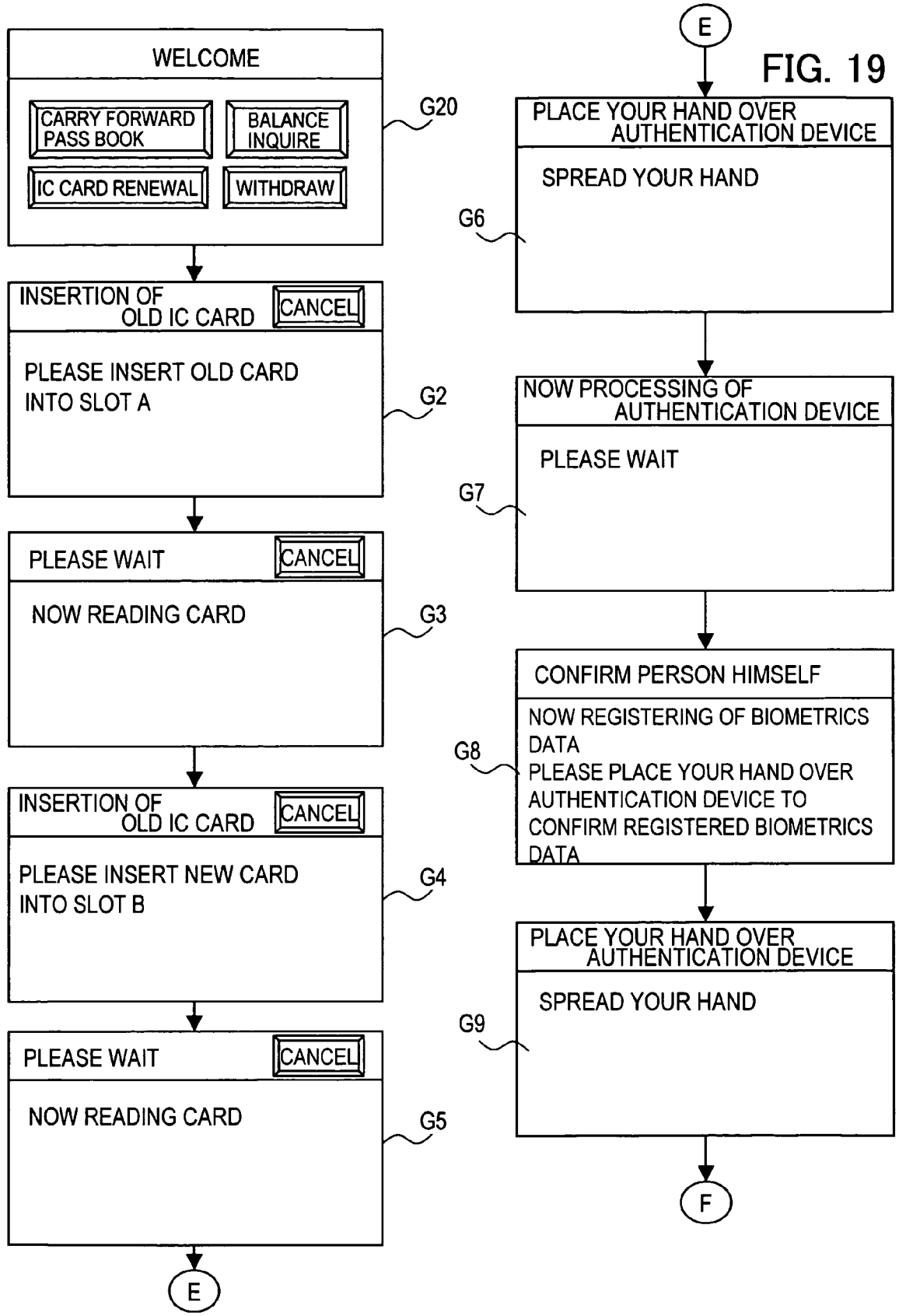
FIG. 19 is a (first) explanatory diagram of guidance screens for the renewal processing of FIG. 17 and FIG. 18; and, FIG. 20 is a (second) explanatory diagram of guidance screens for the renewal processing of FIG. 17 and FIG. 18.
Figure 20:
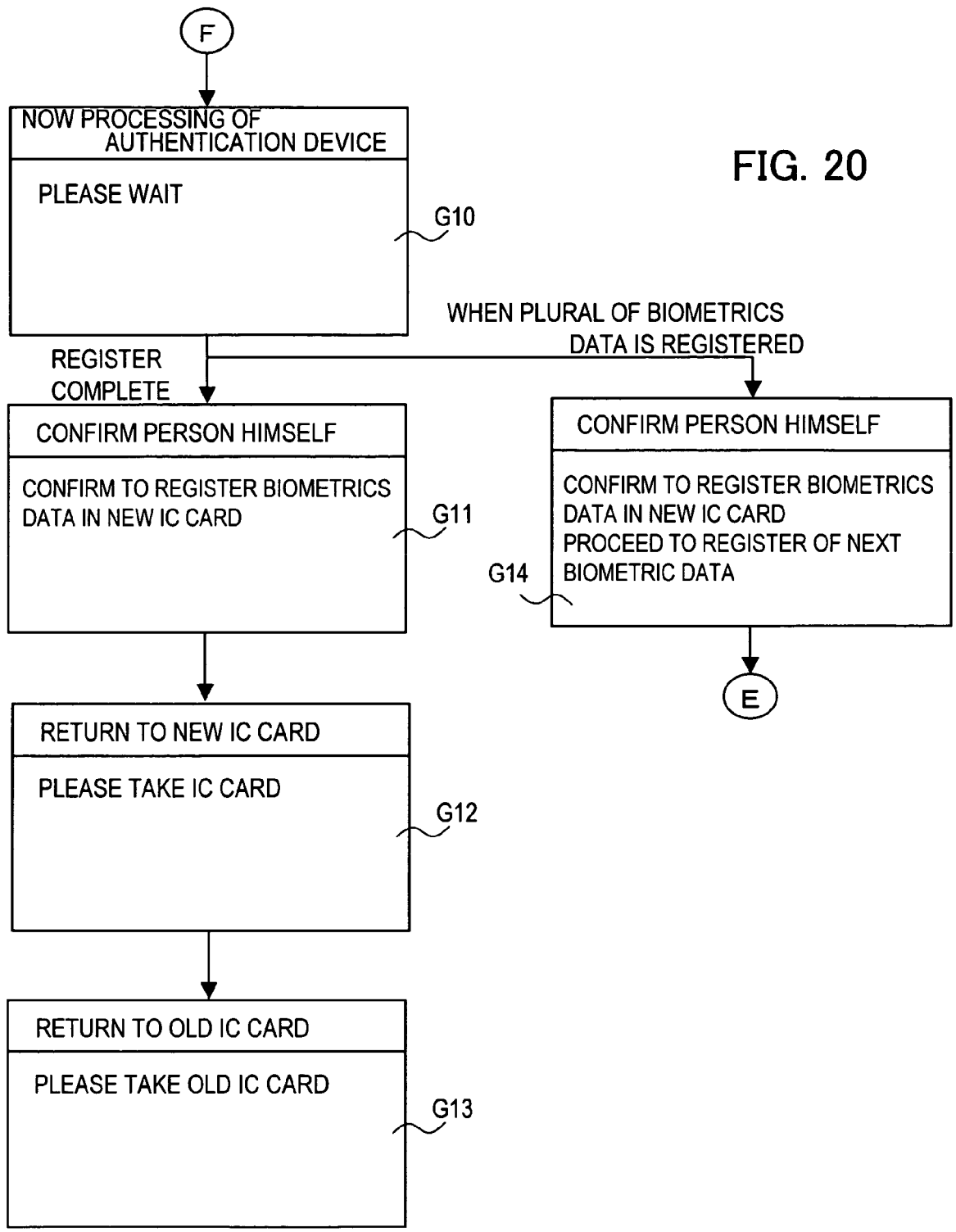

FIG. 19 and FIG. 20 explain guidance screens for IC card renewal processing, comprising biometrics authentication processing by the automated transaction machine. The IC card renewal processing is the same as in FIG. 13 and FIG. 14.

The transaction selection screen G20 of FIG. 19 is displayed on the UOP 6-1 of the ATM 6. Here, four transaction types, which are bankbook carry-over, balance inquiry, payment, and IC card renewal, can be selected. Because renewal is desired, the user touches the IC card renewal icon on the selection screen G20. By this means, renewal processing is begun. Similarly to step S10, the user inserts an expired IC card 5 with biometrics authentication functions (an old IC card) into the IC card reader/writer 9 according to the old IC card insertion guidance screens G2, G3 of FIG. 19.

Next, similarly to step S12, the user inserts an IC card 5-1 with biometrics authentication functions (a new IC card) into the IC card reader/writer 9-1, according to the new IC card insertion guidance screens G4, G5 of FIG. 19.

After steps S14, S16, S18 and S20, similarly to step S22, the palm guidance screen G6 of FIG. 19 is displayed, and the palm of the user is guided to the vein sensor 1 of the authentication device 26. Then, after step S24, a screen G7 indicating authentication is in progress is displayed, and in step S26 the screen G8 of FIG. 19 indicating the individual has been confirmed is displayed.

In step S28, for purposes of verification, the palm guidance screen G9 of FIG. 19 is displayed, and the palm of the user is guided to the vein sensor 1 of the image capture device 26. Then, if in step S30 the image capture result is satisfactory, palm blood vessel image data C is obtained, and the authentication processing screen G10 of FIG. 20 is displayed.

Then, if in step S32 the identity of the individual is confirmed through biometrics authentication using the new IC card 5-1, the screen G11 indicating the end of registration in FIG. 20 is displayed, and if the palm blood vessel image of an agent is to be registered for biometrics authentication of an agent who has received the consent of the individual, by touching the next biometrics data registration icon on the UOP 6-1, the registration continuation screen G14 of FIG. 20 is displayed, and processing returns to step S22.

Further, when in step S36 a next set of biometrics data is not to be registered, the vein authentication functions of the old IC card 5 are rendered inactive, the new IC card 5-1 return screen G12 of FIG. 20 is displayed, and the new IC card 5-1 is returned from the IC card reader/writer 61. Also, the old IC card 5 return screen G13 of FIG. 20 is displayed, and the old IC card 5 is returned from the IC card reader/writer 9-1.

Other Embodiments

In the above embodiments, biometrics authentication was explained for the case of palm vein pattern authentication; but application to authentication using finger vein patterns, to palm-prints and other characteristics of the hand, as well as to authentication using fingerprints, facial features, and other biometrics characteristics is possible. Further, IC card renewal devices and automated equipment used in financial operations were explained; but application to automated ticket issuing equipment, automated vending equipment, and to automated machines and computers in other areas, as well as to door opening/closing equipment in place of keys, and to other equipment where individual authentication is required, is possible.

Further, two verification data sets were used in verification for a terminal and IC card; but verification may be performed for an IC card alone, and only one type of verification data may be used. Similarly, an example in which two IC card reader/writers were used was explained, but renewal may be performed using a single IC card reader/writer. For example, a configuration may be adopted such that, after inserting the old IC card and performing reading, the old card is temporally stored, and the new IC card is inserted and read.

In addition, old IC cards can be collected, adopting a mode of use in which the biometrics data in the old IC cards not deleted, but the biometrics authentication functions are blocked.

In the above, embodiments of the invention have been explained; but the invention can be variously modified within the scope of the invention, and these modifications are not excluded from the scope of the invention.

Because biometrics authentication using an old IC card is employed to confirm the identity of an individual through biometrics authentication, confirmation of the identity of the individual can be performed rigorously using the IC card with biometrics authentication functions, so that illicit use at the time of renewal can be prevented; further, if the individual confirmation is satisfactory, the biometrics data obtained in the biometrics authentication can be registered in a new IC card the legitimacy of which has been confirmed. By this means, with a single image capture, biometrics data which has been confirmed to be that of the individual in question using the old IC card can be registered in the new IC card without being divulged to third parties, and biometrics data can easily be migrated to the new IC card.

What is claimed is:

1. A renewal apparatus for an IC card having biometrics authentication functions, which performs renewal of an IC card in which biometrics characteristic data detected from a human body is registered and which has functions for verifying biometrics characteristic data detected for said body against said registered biometrics characteristic data and performing biometrics authentication, comprising:
 a detection device, which detects data from said body;
 an IC card reader/writer, which reads and writes an old IC card for renewal and a new IC card; and
 a control unit, which extracts said biometrics characteristic data from the output of said detection device and transmits the characteristic data to said old IC card,
 and wherein said control unit uses said biometrics authentication functions of said old IC card to verify said registered biometrics characteristic data against said transmitted biometrics characteristic data, and according to whether biometrics authentication is satisfactory based on the verification result, registers said extracted biometrics characteristic data in said new IC card.

2. The renewal apparatus for an IC card having biometrics authentication functions according to claim 1, wherein said control unit, after registration of data in said new IC card, blocks said biometrics authentication functions of said old IC card.

3. The renewal apparatus for an IC card having biometrics authentication functions according to claim 1, wherein said control unit verifies holder information, read by said IC card reader/writer, for said old IC card and said new IC card, and confirms the legitimacy of the correspondence between said old IC card and said new IC card.

4. The renewal apparatus for an IC card having biometrics authentication functions according to claim 1, wherein said control unit confirms the legitimacy of said old IC card and of said new IC card from issuer information, read by said IC card reader/writer from said old IC card and said new IC card.

5. The renewal apparatus for an IC card having biometrics authentication functions according to claim 1, wherein said control unit, after registration of data in said new IC card, deletes said biometrics characteristic data in said old IC card.

6. The renewal apparatus for an IC card having biometrics authentication functions according to claim 1, wherein said detection device comprises an image capture device which captures images of the body of the user.

7. The renewal apparatus for an IC card having biometrics authentication functions according to claim 6, wherein said image capture device comprises a unit which captures images of blood vessels of said user.

8. The renewal apparatus for an IC card having biometrics authentication functions according to claim 1, wherein said IC card reader/writer comprises:
 a first IC card reader/writer, which reads and writes said old IC card; and
 a second IC card reader/writer, which reads and writes said new IC card.

9. The renewal apparatus for an IC card having biometrics authentication functions according to claim 1, wherein said control unit, after registering said characteristic data in said new IC card, again detects data from said body using said detection device, extracts said biometrics characteristic data from the output of said detection device, transmits said biometrics characteristic data to said new IC card, and causes said new IC card to perform verification of said registered biometrics characteristic data against said transmitted biometrics characteristic data.

10. The renewal apparatus for an IC card having biometrics authentication functions according to claim 1, wherein said biometrics authentication functions of said old IC card and said new IC card alone access said registered biometrics characteristic data.

11. A renewal method for an IC card having biometrics authentication functions, in which biometrics characteristic data detected from a human body is registered, biometrics characteristic data detected for said body is verified against said registered biometrics characteristic data, and biometrics authentication is performed, comprising the steps of:

- detecting data from said body and extracting said biometrics characteristic data;
- transmitting said extracted biometrics characteristic data to an old IC card to be renewed;
- verifying said registered biometrics characteristic data against said transmitted biometrics characteristic data, using said biometrics authentication functions of said old IC card; and
- registering said extracted biometrics characteristic data in a new IC card in response to satisfactory biometrics authentication according to said verification result.

12. The renewal method for an IC card having biometrics authentication functions according to claim 11, further comprising a step, after registration of data in said new IC card, of blocking said biometrics authentication functions of said old IC card.

13. The renewal method for an IC card having biometrics authentication functions according to claim 11, further comprising a step, prior to said biometrics detection, of verifying holder information read by an IC card reader/writer from said old IC card and from said new IC card, and of confirming the legitimacy of the correspondence between said old IC card and said new IC card.

14. The renewal method for an IC card having biometrics authentication functions according to claim 11, further comprising a step, prior to said biometrics detection, of confirming the legitimacy of said old IC card and of said new IC card from issuer information, read by an IC card reader/writer, for said old IC card and for said new IC card.

15. The renewal method for an IC card having biometrics authentication functions according to claim 11, further comprising a step, after registration of data in said new IC card, of deleting said characteristic data in said old IC card.

16. The renewal method for an IC card having biometrics authentication functions according to claim 11, wherein said detection step comprises a step of capture an image of the body of the user with an image capture device.

17. The renewal method for an IC card having biometrics authentication functions according to claim 16, wherein said image capture step comprises a step of capturing an image of blood vessels of said user.

18. The renewal method for an IC card having biometrics authentication functions according to claim 13, wherein said confirmation step comprises:

- a step of reading said holder information from a first IC card reader/writer which reads and writes said old IC card; and
- a step of reading said holder information from a second IC card reader/writer which reads and writes said new IC card.

19. The renewal method for an IC card having biometrics authentication functions according to claim 11, further comprising:

- a step, after registration of said characteristic data in said new IC card;
- a step of again detecting said biometrics data from said detection device;
- a step of extracting said biometrics characteristic data from the output of said detection device;
- a step of transmitting said biometrics characteristic data to said new IC card; and
- a step of verifying said biometrics characteristic data registered in said new IC card against said transmitted biometrics characteristic data.

* * * * *